United States Patent
Baldemair et al.

(10) Patent No.: US 11,159,949 B2
(45) Date of Patent: Oct. 26, 2021

(54) SUPPORT FOR FREQUENCY-OVERLAPPING CARRIERS

(71) Applicant: Telefonaktiebolaget LM Ericsson (publ), Stockholm (SE)

(72) Inventors: Robert Baldemair, Solna (SE); Johan Bergman, Stockholm (SE); Erik Dahlman, Stockholm (SE); Olof Liberg, Stockholm (SE); Stefan Parkvall, Bromma (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 231 days.

(21) Appl. No.: 16/491,493

(22) PCT Filed: Mar. 29, 2018

(86) PCT No.: PCT/EP2018/058236
§ 371 (c)(1),
(2) Date: Sep. 5, 2019

(87) PCT Pub. No.: WO2018/178309
PCT Pub. Date: Oct. 4, 2018

(65) Prior Publication Data
US 2020/0021998 A1 Jan. 16, 2020

Related U.S. Application Data

(60) Provisional application No. 62/479,971, filed on Mar. 31, 2017.

(51) Int. Cl.
*H04W 16/14* (2009.01)
*H04W 88/10* (2009.01)

(52) U.S. Cl.
CPC ............ *H04W 16/14* (2013.01); *H04W 88/10* (2013.01)

(58) Field of Classification Search
CPC . H04W 16/14; H04W 72/0453; H04W 76/15; H04W 72/042; H04W 36/0066;
(Continued)

(56) References Cited

U.S. PATENT DOCUMENTS

2018/0035416 A1* 2/2018 Yi ..................... H04W 72/0406
2018/0124744 A1* 5/2018 Xue ................... H04W 72/042
(Continued)

FOREIGN PATENT DOCUMENTS

EP          3327973 A1    5/2018
RU      2010112490 A      9/2008
(Continued)

OTHER PUBLICATIONS

Russian Examination Report and English Translation date Feb. 3, 2020 for Application No. 2019129812, consisting of 4-pages.
(Continued)

*Primary Examiner* — Dung Hong
(74) *Attorney, Agent, or Firm* — Christopher & Weisberg, P.A.

(57) ABSTRACT

A method and network node for providing support for frequency-overlapping carriers among a first radio access technology, RAT, and a second RAT is provided. Second RAT information to signal to the first RAT wireless device is determined. The second RAT information configured to allow the first RAT wireless device to determine, at a resource element level, resources reserved for second RAT transmissions. The second RAT information is caused to be communicated to the first RAT wireless device.

27 Claims, 12 Drawing Sheets

(58) Field of Classification Search
CPC ......... H04W 36/0072; H04W 72/1215; H04W 72/005; H04W 72/0486; H04L 5/001; H04L 5/003

See application file for complete search history.

(56) References Cited

U.S. PATENT DOCUMENTS

| | | | |
|---|---|---|---|
| 2018/0145818 A1* | 5/2018 | Choi | H04L 5/0051 |
| 2018/0212726 A1* | 7/2018 | Xue | H04W 4/70 |
| 2018/0234930 A1* | 8/2018 | Chen | H04W 72/005 |
| 2018/0279303 A1* | 9/2018 | Sun | H04W 72/1278 |
| 2020/0288482 A1* | 9/2020 | Yi | H04L 5/0053 |

FOREIGN PATENT DOCUMENTS

| | | |
|---|---|---|
| RU | 2011150941 A | 12/2011 |
| WO | 2009031659 A1 | 3/2009 |
| WO | 2017014600 A1 | 1/2017 |

OTHER PUBLICATIONS

International Search Report and Written Opinion dated Jul. 4, 2018 for International Application No. PCT/EP2018/058236 filed on Mar. 29, 2018, consisting of 10-pages.

3GPP TSG RAN WG1 meeting #87 R1-1611861; Title: On coexistence of NR and LTE; Agenda Item: 7.1.7; Source: LG Electronics; Document for: Discussion and decision; Location and Date: Reno, USA, Nov. 14-18, 2016, consisting of 4-pages.

3GPP TSG-RAN WG1 meeting #88 R1-1703026; Title: NR/LTE co-existence—Downlink; Agenda Item: 8.1.8; Source: Ericsson; Document for: Discussion and Decision; Location and Date: Athens, Greece, Feb. 13-17, 2017, consisting of 4-pages.

Japanese Office Action and English Translation dated Jan. 5, 2021 for Patent Application No. 2019-553338, consisting of 11-pages.

3GPP TSG RAN WG1 NR Ad-Hoc Meeting R1-1700402; Title: Consideration of NR signals and channels mapping around LTE CRS; Agenda Item: 5.1.3.3; Source: Huawei, HiSilicon; Document for: Discussion and decision; Date and Location: Jan. 16-20, 2017, Spokane, USA, consisting of 3-pages.

3GPP TSG RAN WG1 Meeting #88 R1-1702823; Title: Discussion on SS burst set composition and SS block index indication for NR; Agenda Item: 8.1.1.1.2; Source: NTT Docomo, Inc.; Document for: Discussion and Decision; Date and Location: Feb. 13-17, 2017, Athens, Greece, consisting of 7-pages.

3GPP TSG RAN WG1 Meeting #88 R1-1703559; Title: Coexistence of NR DL and LTE; Agenda Item: 8.1.8; Source: Huawei, HiSilicon; Document for: Discussion and decision; Date and Location: Feb. 13-17, 2017, Athens, Greece, consisting of 8-pages.

3GPP TSG RAN WG1 Meeting #88bis R1-1705068; Title: Mini-slot usage for eMBB in licensed band; Agenda Item: 11.3.3.1; Source: Huawei, HiSilicon; Document for: Discussion and decision; Date and Location: Apr. 3-7, 2017, Spokane, USA, consisting of 6-pages.

3GPP TSG RAN WG1 #88bis R1-1705435; Title: LTE-NR coexistence for DL; Agenda Item: 8.1.8; Source: Samsung; Document for: Discussion and Decision; Date and Location: Apr. 3-7, 2017, Spokane, USA, consisting of 6-pages.

European Communication dated Nov. 27, 2019 for Application No. 18 715 017.2 consisting of 5-pages.

3GPP TSG-RAN WG1 #88bis R1-1704816; Title: Reserved resources supporting NR/LTE co-existence; Source: Ericsson; Agenda Item: 8.1.8; Document for: Discussion and Decision; Location and Date: Spokane, WA, USA, Apr. 3-7, 2017, consisting of 2-pages.

* cited by examiner

SUPPORT FOR FREQUENCY-OVERLAPPING CARRIERS

CROSS-REFERENCE TO RELATED APPLICATIONS

This application is a Submission Under 35 U.S.C. § 371 for U.S. National Stage Patent Application of International Application No.: PCT/EP2018/058236, filed Mar. 29, 2018 entitled "SUPPORT FOR FREQUENCY-OVERLAPPING CARRIERS," which claims priority to U.S. Provisional Application No. 62/479,971, filed Mar. 31, 2017, entitled "SIGNALING OF RESERVED NEW RADIO (NR) RESOURCES FOR LONG TERN EVOLUTION (LTE) AND NARROW BAND INTERNET OF THINGS (NB-IOT) COEXISTENCE," the entireties of both of which are incorporated herein by reference.

TECHNICAL FIELD

This disclosure relates to wireless communications, and in particular support for frequency-overlapping carriers among a first radio access technology (RAT), and a second RAT.

BACKGROUND

The possibility for efficient same-frequency-band co-existence with Long-term Evolution (LTE) RAT type as well as with NB-IoT (Narrow Band Internet of Things) is a factor in New Radio (NR) RAT development since LTE machine type communication (MTC) and NB-IoT devices are expected to remain in networks for many years. Efficient coexistence between NR, LTE, and NB-IoT gives rise to flexible network and spectrum migration possibilities toward NR.

LTE/NB-IoT co-existence with NR within the same spectrum may be realized with LTE/NB-IoT and NR being deployed with frequency-overlapping carriers ("co-carrier co-existence") as well as frequency-adjacent non-overlapping carriers ("adjacent-carrier co-existence"). One manner to help ensure good co-existence between NR and LTE/NB-IoT is the possibility for NR downlink transmissions to avoid resources used by non-dynamically scheduled LTE/NB-IoT downlink transmission. Such non-dynamic transmissions include one or more of:

Synchronization signals: primary synchronization signal/secondary synchronization signal (PSS/SSS), narrow band PSS (NPSS)/narrow band SSS (NSSS);
Channels carrying Master Information Block (i.e., MIB, MIB-Narrow Band (NB)): physical broadcast channel (PBCH), narrow band PBCH (NPBCH);
Channels carrying System Information Block 1 (i.e. SIB1, SIB1-(broadband) BR, SIB1-(narrow band) NB): physical downlink shared channel (PDSCH), narrow band PDSCH (NPDSCH);
Channels carrying downlink control information: physical downlink control channel (PDCCH), physical control format indicator channel (PCFICH), physical hybrid automatic repeat request indicator channel (PHICH); and
Reference signals: cell specific reference signal (CRS), channel state information reference signal (CSI-RS), narrow band reference signal (NRS), positioning reference signal (PRS).

Some relevant standards committees have decided that NR may support reserved resources as a tool to help enable general forward compatibility. See for example "NR/LTE co-existence—Downlink", 3GPP TSG RAN WG1 #88, Tdoc R1-1703026.

A reserved resource may be a set of NR resource elements configured to be non-transmitted or unused for NR purposes, thus being possible to use for transmissions introduced in later releases without breaking backwards compatibility.

Most NR resources can in principle be configured as reserved resources. The exception may be resources used for signals that a wireless device receives before reserved resources can be configured. This means that all resources may be potential reserved resources except the resources used for synchronization signals and for transmitting certain system information.

SUMMARY

Some embodiments advantageously provide a method and system for improving efficiency in configuring NR reserved resources for supporting NR co-carrier co-existence with LTE/NB-IoT. The efficiency is improved in two ways:

More efficient signaling so that the overhead introduced by such signaling is reduced; and
More efficient in resource sharing between NR and LTE/NB-IoT. Reserved resources can be identified with finer resolution in both the time and frequency dimensions. For example, specific resource elements can be reserved within an OFDM symbol, a slot, a resource block, or a subframe. This is more efficient than reserving an entire OFDM symbol, slot, resource block, or subframe.

According to one aspect of the disclosure, a method performed by a network node for providing support for frequency-overlapping carriers among a first radio access technology, RAT, and a second RAT is provided. Second RAT information to signal to the first RAT wireless device is determined where the second RAT information is configured to allow the first RAT wireless device to determine, at a resource element level, resources reserved for second RAT transmissions. The second RAT information is caused to be communicated to the first RAT wireless device.

According to one embodiment of this aspect, the resources reserved for the second RAT transmissions include a first plurality of resource elements of a first symbol. The second RAT information is configured to allow the first RAT wireless device to differentiate second RAT transmissions on the first plurality of resource elements of the first symbol from first RAT transmissions on a second plurality of resources elements of the first symbol where the first plurality of resources element being different from the second plurality of resource elements. According to one embodiment of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

According to one embodiment of this aspect, the reference signal transmission includes the transmission of a cell-specific reference signal. According to one embodiment of this aspect, the second RAT information includes at least one of: at least one physical resource block, PRB, index used for the second RAT transmissions, a timing relationship between a first RAT cell and a second RAT cell, a physical cell identity and at least one number of at least one reference signal port, and an indication of a second RAT downlink control region. According to one embodiment of this aspect, the second RAT information includes at least one of: System Information Block, SIB, scheduling information, physical downlink shared channel bitmap patterns for the second RAT, a system information, SI, message including scheduling information, and multi broadcast single frequency network, MBSFN, configuration information. According to one embodiment of this aspect, the second RAT information includes a frequency relationship between a first RAT cell and a second RAT cell.

According to one embodiment of this aspect, the second RAT information includes an indication whether a second RAT cell uses one of a cyclic prefix, CP, and an extended CP. According to one embodiment of this aspect, the first RAT is New Radio, NR, and the second RAT is Long Term Evolution, LTE.

According to another aspect of the disclosure, a network node for providing support for frequency-overlapping carriers among a first radio access technology, RAT, and a second RAT is provided. The network node includes processing circuitry configured to: determine second RAT information to signal to the first RAT wireless device where the second RAT information configured to allow the first RAT wireless device to determine, at a resource element level, resources reserved for second RAT transmissions, and cause the second RAT information to be communicated to the first RAT wireless device.

According to one embodiment of this aspect, the resources reserved for the second RAT transmissions include a first plurality of resource elements of a first symbol. The second RAT information is configured to allow the first RAT wireless device to differentiate second RAT transmissions on the first plurality of resource elements of the first symbol from first RAT transmissions on a second plurality of resources elements of the first symbol where the first plurality of resources element being different from the second plurality of resource elements. According to one embodiment of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

According to one embodiment of this aspect, the reference signal transmission includes the transmission of a cell-specific reference signal. According to one embodiment of this aspect, the second RAT information includes at least one of: at least one physical resource block, PRB, index used for the second RAT transmissions; a timing relationship between a first RAT cell and a second RAT cell; a physical cell identity and at least one number of at least one reference signal port; and an indication of a second RAT downlink control region. According to one embodiment of this aspect, the second RAT information includes at least one of: System Information Block, SIB, scheduling information; physical downlink shared channel bitmap patterns for the second RAT; a system information, SI, message including scheduling information; and multi broadcast single frequency network, MBSFN, configuration information.

According to one embodiment of this aspect, the second RAT information includes a frequency relationship between a first RAT cell and a second RAT cell. According to one embodiment of this aspect, the second RAT information includes an indication whether a second RAT cell uses one of a cycle prefix, CP, and an extended CP. According to another aspect of the disclosure, a method performed by a wireless device for supporting frequency-overlapping carriers among a first radio access technology, RAT, and a second RAT is provided. Second RAT information is received. Resources reserved for second RAT transmissions are determined, at the resource element level, based on the second RAT information. Transmissions including first RAT resources and second RAT resources are received. At least first RAT resources are processed based at least in part on the second RAT information.

According to one embodiment of this aspect, the second RAT resources are processed based at least in part on the second RAT information. According to one embodiment of this aspect, the second RAT resources include a first plurality of resource elements of a first symbol. According to one embodiment of this aspect, reserved resources for second RAT transmissions on the first plurality of resource elements of the first symbol are differentiated, at the resource element level, from resources for the first RAT transmissions on a second plurality of resources elements of the first symbol where the first plurality of resources elements are different from the second plurality of resource elements.

According to one embodiment of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission. According to one embodiment of this aspect, the reference signal transmission includes the transmission of a cell-specific reference signal.

According to one embodiment of this aspect, the second RAT information includes at least one of: at least one physical resource block, PRB, index used for the second RAT transmissions; a timing relationship between a first RAT cell and a second RAT cell; a physical cell identity and at least one number of at least one reference signal port; and an indication of a second RAT downlink control region. According to one embodiment of this aspect, the second RAT information includes at least one of: System Information Block, SIB, scheduling information; physical downlink shared channel bitmap patterns for the second RAT; a system information, SI, message including scheduling information; and multi broadcast single frequency network, MBSFN, configuration information. According to one embodiment of this aspect, the second RAT information include a frequency relationship between a first RAT cell and a second RAT cell.

According to one embodiment of this aspect, the second RAT information includes an indication whether a second RAT cell uses one of a cycle prefix, CP, and an extended CP. According to one embodiment of this aspect, the first RAT is New Radio, NR, and the second RAT is Long Term Evolution, LTE.

According to another aspect of the disclosure, a wireless device for supporting frequency-overlapping carriers among a first radio access technology, RAT, and a second RAT is provided. The wireless device includes processing circuitry configured to: receive second RAT information; determine, at a resource element level, resources reserved for second RAT transmissions based on the second RAT information; receive transmissions including first RAT resources and second RAT resources; and process at least first RAT resources based at least in part on the second RAT information.

According to one embodiment of this aspect, the processing circuitry is further configured to process the second RAT resources based at least in part on the received second RAT information. According to one embodiment of this aspect, the reserved resources for the second RAT transmissions include a first plurality of resource elements of a first symbol. According to one embodiment of this aspect, the processing circuitry is further configured to differentiate, at the resource element level, of reserved resources for second RAT transmissions on a first plurality of resource elements of the first symbol from resources for the first RAT transmissions on a second plurality of resources elements of the first symbol, the first plurality of resources elements being different from the second plurality of resource elements.

According to one embodiment of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission. According to one embodiment of this aspect, the reference signal transmission includes the transmission of a cell-specific reference signal. According to one embodiment of this aspect, the second RAT information includes at least one of: at least one physical resource block, PRB, index used for the second RAT transmissions; a timing relationship between a first RAT cell and a second RAT cell; a physical cell identity and at least one number of at least one reference signal port; and an indication of a second RAT downlink control region.

According to one embodiment of this aspect, the second RAT information includes at least one of: System Information Block, SIB, scheduling information; physical downlink shared channel bitmap patterns for the second RAT; a system information, SI, message including scheduling information; and multi broadcast single frequency network, MBSFN, configuration information. According to one embodiment of this aspect, the second RAT information include a frequency relationship between a first RAT cell and a second RAT cell. According to one embodiment of this aspect, the second RAT information includes an indication whether a second RAT cell uses one of a cycle prefix, CP, and an extended CP. According to one embodiment of this aspect, the first RAT is New Radio, NR, and the second RAT is Long Term Evolution, LTE.

According to another aspect of the disclosure, a network node for signaling information to a first radio access technology, RAT, wireless device to allow the first RAT wireless device to support frequency-overlapping carriers among the first RAT and a second RAT is provided. The network node includes a RAT information determination module configured to: determine second RAT information to signal to the first RAT wireless device, the second RAT information configured to allow the first RAT wireless device to determine, at a resource element level, resources reserved for second RAT transmissions; and cause the second RAT information to be communicated to the first RAT wireless device.

According to another aspect of the disclosure, a wireless device for supporting frequency-overlapping carriers among a first radio access technology, RAT, and a second RAT is provided. The wireless device includes transceiver module configured to: receive second RAT information; and receive transmissions including first RAT resources and second RAT resources. The wireless device includes RAT information processing module configured to: determine, at a resource element level, resources reserved for second RAT transmissions based on the second RAT information; and process at least first RAT resources based at least in part on the second RAT information.

According to another aspect of the disclosure, a computer program product for providing support for frequency-overlapping carriers among a first radio access technology, RAT, and a second RAT is provided. The computer program product comprises computer readable program code that, when executed by a processor, causes the computer program product to perform one or more functions of a network node described herein.

According to another aspect of the disclosure, a computer program product for providing support for frequency-overlapping carriers among a first radio access technology, RAT, and a second RAT is provided. The computer program product comprises computer readable program code that, when executed by a processor, causes the computer program product to perform one or more functions of a wireless device described herein.

According to another aspect of the disclosure, a computer program for providing support for frequency-overlapping carriers among a first radio access technology, RAT, and a second RAT is provided. The computer program, when executed by a processor, performing one or more functions of a network node described herein.

According to another aspect of the disclosure, a computer program for providing support for frequency-overlapping carriers among a first radio access technology, RAT, and a second RAT is provided. The computer program, when executed by a processor, performing one or more functions of a wireless device described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
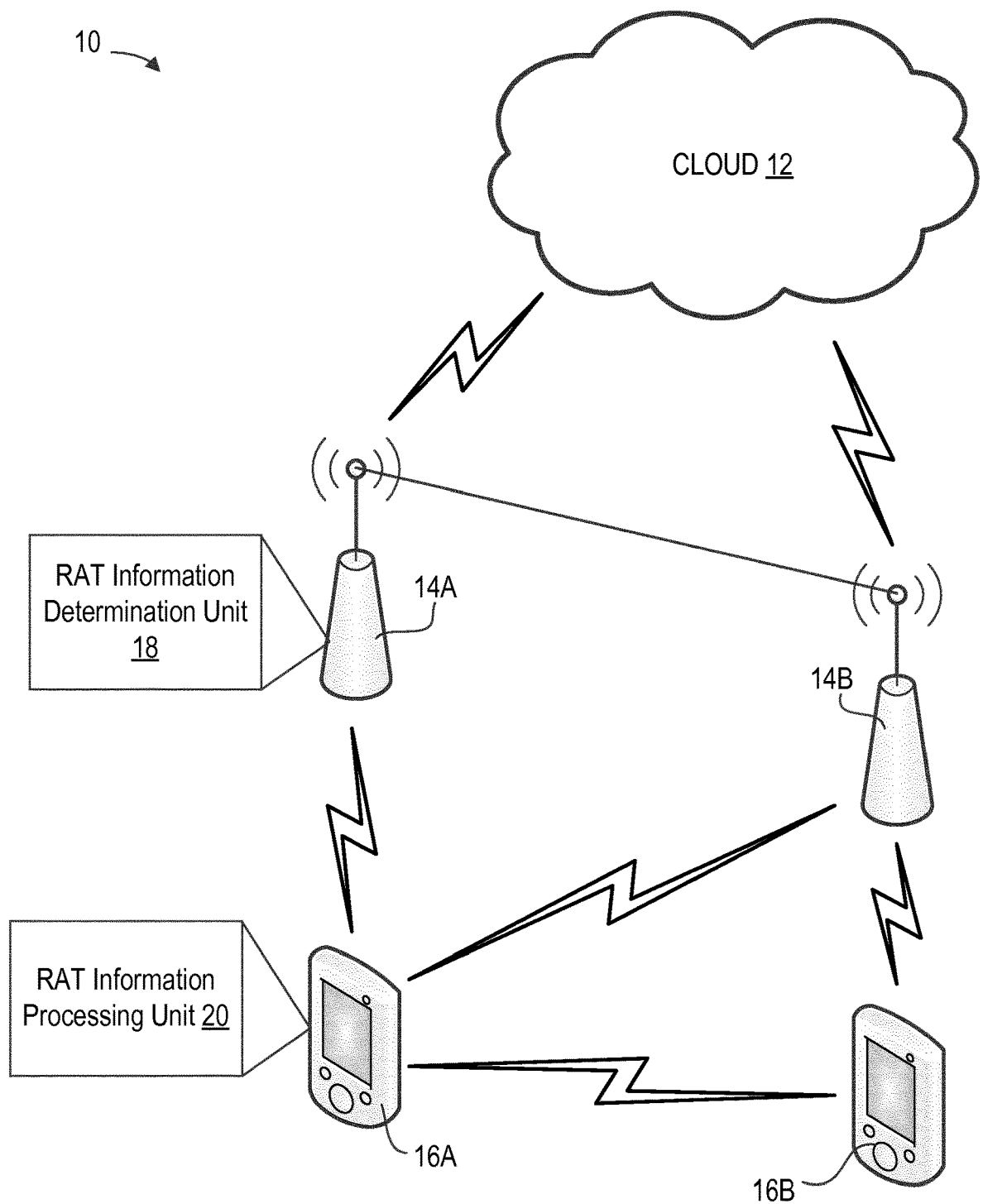
FIG. 1 is a block diagram of a wireless communication system constructed in accordance with principles herein.

The concept of reserved resources can be used to support NR radio access technology (RAT) co-carrier co-existence with LTE/NB-IoT RAT where NR resources overlapping with LTE/NB-IoT transmissions may be configured as reserved resources, thus allowing for blanking (avoiding these resources for NR transmission) of such resources without "confusing" NR wireless devices. An NR wireless device may be "confused" if, without knowing which of these resources elements (REs) are taken by LTE and NB-IoT transmissions, the NR wireless device decodes received signals from these REs in the decoding process for its desired transmissions, but the desired transmission (e.g., NR transmissions), from the NR wireless device perspective, will be missing in these REs. One approach is for the NR wireless devices to treat resource elements that are configured as reserved resources as punctured, or alternatively rate-matched in which punctured resources may refer to reserved resources that are interspersed between a broader range of resource elements in a time-frequency resource grid. In principle, such blanking of NR resources may be achieved by utilizing generic reserved resources that may be reserved at the per-OFDM symbol level. However, these generic reserved resources have limited flexibility and may not be the most efficient approach. As an example, when generic reserved resources are configured on a per-OFDM-symbol basis, an NR wireless device avoiding LTE CRS would result in an entire NR OFDM symbol being treated as a reserved resource even though only a subset of the resource elements within that symbol may coincide with LTE CRS. Hence, the subset of resource elements of the symbol that do not coincide with LTE CRS may remain unused, which limits efficiency of the system.

In practice, for signaling reasons, reserved resources targeting forward compatibility may have a simple and generic structure. One example of a simple and generic structure may include a single orthogonal frequency division multiplex (OFDM) symbol and/or a continuous time/frequency block of a certain size as a fundamental unit or building block for a configured reserved resource.

The disclosure solves at least some of the problems with existing systems and methods. In one or more embodiments, higher efficiency can be achieved by configuring reserved resources with specific time/frequency structures matching one or more LTE/NB-IoT RAT signals. Theses specific time/frequency structures or patterns may be defined at the resource element level of a symbol such as to allow the use of resource elements within the symbol that do not coincide with the specific time/frequency structure. In one or more embodiments described herein are directed to sending LTE/NB-IoT RAT information from a network node to a wireless device configured to process the information according to new radio (NR) RAT protocols such as to allow the wireless device to identify, at the resource element level, resource elements coinciding with LTE/NB-IoT signals. In one or more embodiments, to facilitate compatibility with LTE and NB-IoT, information relating to LTE and NB-IoT communication is sent to the NR wireless device and used by the wireless device to enable reception of LTE/NB-IoT downlink transmissions. One or more embodiments described herein are directed to LTE/NB-IoT and NR deployment with frequency-overlapping carriers ("co-carrier co-existence").

Before describing in detail exemplary embodiments, it is noted that the embodiments reside primarily in combinations of apparatus components and processing steps related to signaling of reserved resources for long term evolution (LTE) and narrow band Internet of things (NB-IOT) coexistence. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In one or more embodiments described herein the sending of information from a network node to a wireless device configured to process LTE/NB-IoT information according to new radio (NR) protocols is disclosed. The LTE/NB-IoT transmission is coexisting with NR transmissions; in order for the wireless device to receive the NR transmissions the wireless device receives LTE/NB-IoT information to assist the processing of the reception of NR transmissions. NR may also be referred to as third generation partnership project (3GPP) 5G. To facilitate compatibility of NR with LTE and NB-IoT, information relating to LTE and NB-IoT communication is sent to the NR wireless device and may also be used by the wireless device to enable reception/processing of LTE/NB-IoT downlink transmissions.

Referring now to the drawing figures, in which like elements are referred to by like reference numerals, there is shown in FIG. 1 a block diagram of a wireless communication system 10 constructed in accordance with principles herein. The wireless communication network 10 includes a cloud 12 which may include the Internet and/or the public switched telephone network (PSTN). Cloud 12 may also serve as a backhaul network of the wireless communication system/network 10. The wireless communication network 10 includes one or more network nodes 14 such as network nodes 14A and 14B, where one or more network nodes 14 are referred to collectively as network nodes 14. It is contemplated that interface types can be used for communication between network nodes 14 for communication protocols such as New Radio (NR). The network nodes 14 may serve new radio (NR) wireless devices 16 such as wireless devices 16A and 16B, where one or more wireless devices are referred to collectively herein as NR wireless devices 16. Note that, although only two NR wireless devices 16 and two network nodes 14 are shown for convenience, the wireless communication network 10 may typically include many more NR wireless devices (WDs) 16 and network nodes 14.

The term "wireless device" or mobile terminal used herein may refer to any type of new radio (NR) wireless device communicating with a network node 14 and/or with another wireless device 16 in a cellular or mobile communication system 10. Examples of NR wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc. NR wireless device 16 may be configured to operate according to one or more RATs such as NR and LTE/NB-IoT.

The term "network node" used herein may refer to any kind of radio base station in a radio network which may further comprise any base transceiver station (BTS), base station controller (BSC), radio network controller (RNC), evolved Node B (eNB or eNodeB), NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc. For example, in one embodiment, network node 14A is an eNodeB operating based on a second RAT such as LTE/NB-IoT while network node 14B is a gNB operating based on a first RAT such as NR.

Although embodiments are described herein with reference to certain functions being performed by the network node 14, it is understood that the functions can be performed in other network nodes and elements. It is also understood that the functions of the network node 14 can be distributed across network cloud 12 so that other nodes can perform one or more functions or even parts of functions described herein. For example, network node 14A, e.g., eNodeB, may be configured to perform one or more functions of the signaling process described herein, while network node 14B, e.g., gNB, in communication with network node 14A, is configured to perform one or more other functions of the signaling process described herein. In one or more embodiments, network node 14A is configured to determine second RAT information to signal to the first RAT wireless device 16 and cause the second RAT information to be communicated to the first RAT wireless device 16 by transmitted the second RAT information to network node 14B, where network node 14B transmits the second RAT information to wireless device 16, as discussed herein.

Returning to FIG. 1, the network node 14 has an RAT information determination unit 18 configured to determine second RAT information such as LTE/NB-IoT information to signal to the NR wireless device 16 to enable the NR wireless device 16 to determine resources reserved that are used for LTE/NB-IoT downlink transmissions. The NR wireless device 16 has a RAT information processing unit 20 configured to process LTE/NB-IoT information contained in the signal and may configure the NR wireless device 16 to receive the scheduled LTE and NB-IoT downlink transmissions. In one or more embodiments, LTE/NB-IoT referred to as a second RAT while NR is referred to as a first RAT.

Figure 2:
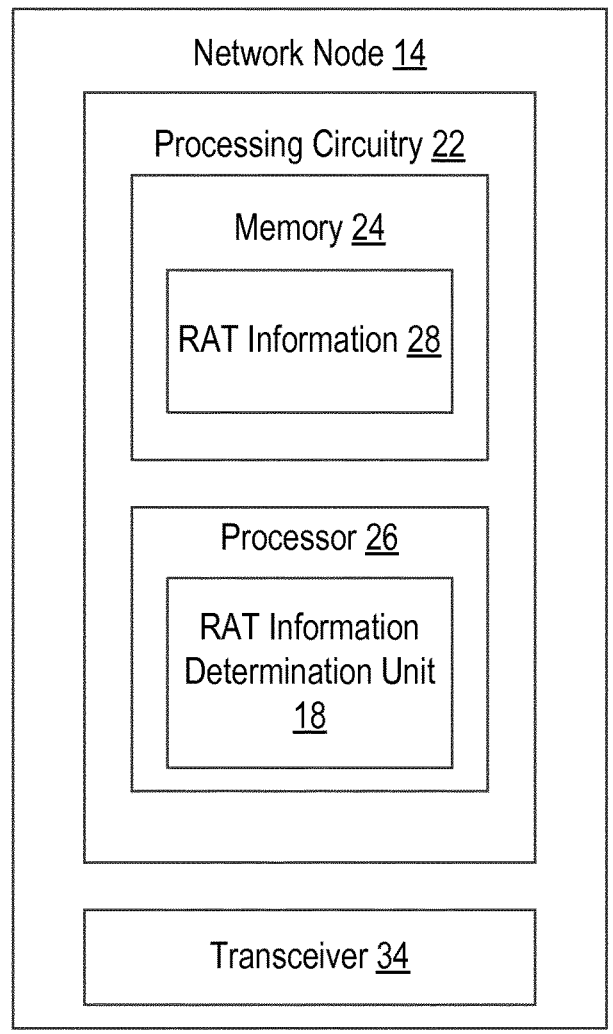
FIG. 2 is a block diagram of a network node configured according to principles set forth herein.

FIG. 2 is a block diagram of a network node 14 configured according to principles set forth herein. The network node 14 includes processing circuitry 22. In some embodiments, the processing circuitry 22 may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. For example, the code may be computer readable program code and/or a computer program, which are executable by processor 26 and/or processing circuitry 22. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store RAT information 28 determined by the RAT information determination unit 18, which is implemented by the processor 26. The RAT information determination unit 18, as noted above, is configured to determine RAT information such as LTE/NB-IoT information to signal to the NR wireless device to enable the NR wireless device to determine resources reserved that are used for LTE and NB-IoT downlink transmissions. The transceiver 34 is configured to signal the determined RAT information to the NR wireless device 16. In some embodiments, the transceiver 34 includes one or more separate transmitter and receiver elements. In one or more embodiments, a computer program product for providing support for frequency-overlapping carriers among a first radio access technology, RAT, and a second RAT is provided. The computer program product may include computer readable program code that, when executed by a processor 26, causes the computer program product to perform one or more functions of network node 14 described herein. In one or more embodiments, a computer program for providing support for frequency-overlapping carriers among a first radio access technology, RAT, and a second RAT is provided. The computer program, when executed by a processor 26, performs one or more functions of network node 14 described herein.

Figure 3:
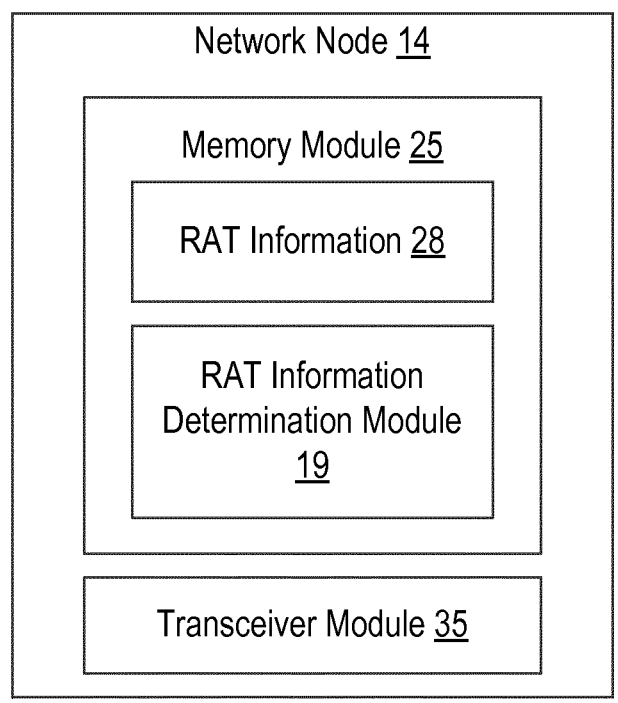
FIG. 3 is a block diagram of an alternative embodiment of the network node.

FIG. 3 is a block diagram of an alternative embodiment of the network node 14, including a memory module 25 configured to store RAT information generated by RAT information determination module 19. The RAT information determination module 19 may be implemented as software executed by a processor. In one or more embodiments, the RAT information determination module 19 is configured to determine second RAT information to signal to the first RAT wireless device 16 where the second RAT information is configured to allow the first RAT wireless device 16 to determine, at a resource element level, resources reserved for second RAT transmissions, and cause the second RAT information to be communicated to the first RAT wireless device 16, as described herein. A transceiver module 35 is configured to signal the RAT information such as LTE/NB-IoT information to the NR wireless device 16. The transceiver module 35 can be implemented in part by software executed by a processor.

In some embodiments, LTE/NB-IoT information may be signaled to the NR wireless device 16 via the transceiver 34 to facilitate the identification of NR reserved resources that accommodate non-dynamically scheduled LTE/NB-IoT downlink transmission, where one or more network nodes 14 may be configured to establish an NR cell and support NR protocol, and one or more network nodes may be configured to establish a LTE/NB-IoT cell and support LTE/NB-IoT protocol. The RAT information such as LTE/NB-IoT information may include one or more of the following items:
1. physical resource block (PRB) indices used by LTE and/or NB-IoT;
2. a timing relationship between NR cell and LTE/NB-IoT cell;
3. physical cell identity (PCID)(LTE and/or NB-IoT) and the number of NRS or CRS ports such that NR wireless devices 16 may determine the reserved CRS and NRS resources accordingly;
4. the LTE downlink control region (this can include, if present the evolved PDCCH, (EPDCCH) region);
5. SIB1, SIB1-BR and/or SIB1-NB scheduling information;
6. LTE (N)PDSCH valid subframe bitmap patterns where a valid subframe may refer to a subframe that can be used for LTE-M or NB-IoT transmissions;
7. SI message scheduling information;
8. the frequency relationship between NR cell and LTE/NB-IoT cell;
9. LTE cyclic prefix (CP) information such as information indicating whether normal CP or extended CP is implemented; and/or
10. multi broadcast single frequency network (MBSFN) configuration information.

In one or more embodiments, the RAT information is signaled by the NR cell.

One or more of items 1-10 may be used by the NR wireless device 16 to configure NR reserved resources specifically tailored to non-dynamically scheduled LTE/NB-IoT downlink transmissions. For example, the NR reserved resources may be specifically configured to coincide with the non-dynamically scheduled LTE/NB-IoT downlink transmissions where resources other than these reserved resources may be used for NR downlink transmission. In one or more embodiments, NR reserved resources includes a portion of resource elements in a first symbol that at least partially coincide with the non-dynamically scheduled LTE/NB-IoT downlink transmissions, thereby allowing one or more of the other resource elements of the first symbol to be used for NR downlink transmissions, i.e., allows for resource reservation at the resource level or resource element level. The non-dynamically scheduled LTE/NB-IoT downlink transmissions include one or more of:
  One or more Synchronization signals: PSS/SSS, NPSS/NSSS.
  Channels carrying Master Information Block (i.e., MIB, MIB-NB): PBCH, NPBCH.
  Channels carrying System Information Block 1 (i.e., SIB1, SIB1-BR, SIB1-NB): PDSCH, NPDSCH.
  Channels carrying System Information messages for LTE machine type communication (MTC) or NB-IoT: PDSCH, NPDSCH.
  Time-frequency region in a downlink transmission that is reserved for downlink control information (PDCCH, PCFICH, PHICH): LTE control region and for EPDCCH.
  One or more reference signals: CRS, CSI-RS, NRS, PRS.
Of note, in some embodiments, the NR wireless device 16 determines channel coding rate matching parameters based on NR reserved resources as determined by the network node 14.

Figure 4:
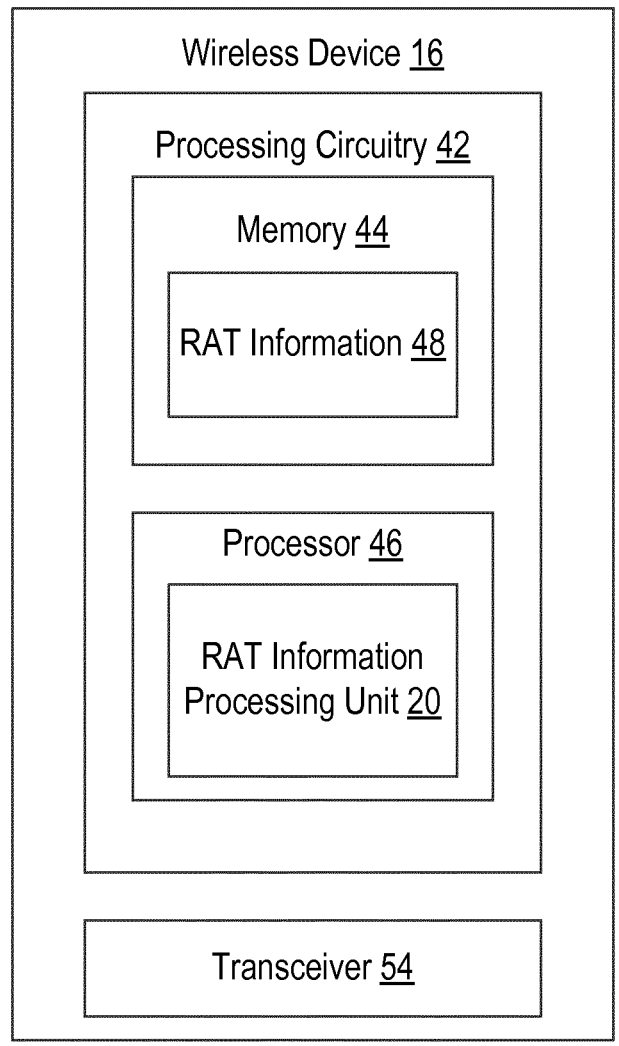
FIG. 4 is a block diagram of a NR wireless device constructed in accordance with principles set forth herein.

FIG. 4 is a block diagram of the wireless device 16 constructed in accordance with principles set forth herein, which includes processing circuitry 42. In some embodiments, the processing circuitry 42 may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. For example, the code may be computer readable program code and/or a computer program, which are executable by processor 46 and/or processing circuitry 42. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store RAT information 48 which is received by the transceiver 54 from the network node 14. The RAT information 48 is processed by the RAT information processing unit 20 which is implemented by the processor 46. The RAT information processing unit 20 is configured to process RAT information such as LTE/NB-IoT information contained in the signal/communication. In one or more embodiments, NR wireless device 16 may be configured to receive the scheduled LTE and NB-IoT downlink transmissions in one or more NR reserved resources. In some embodiments, the transceiver 54 includes one or more separate transmitter and receiver elements. In one or more embodiments, a computer program product for providing support for frequency-overlapping carriers among a first radio access technology, RAT, and a second RAT is provided. The computer program product includes computer readable program code that, when executed by a processor 46, causes the computer program product to perform one or more functions of NR wireless device 16 described herein. In one or more embodiments, a computer program for providing support for frequency-overlapping carriers among a first radio access technology, RAT, and a second RAT is provided. The computer program, when executed by a processor 46, performs one or more functions of NR wireless device 16 described herein.

Figure 5:
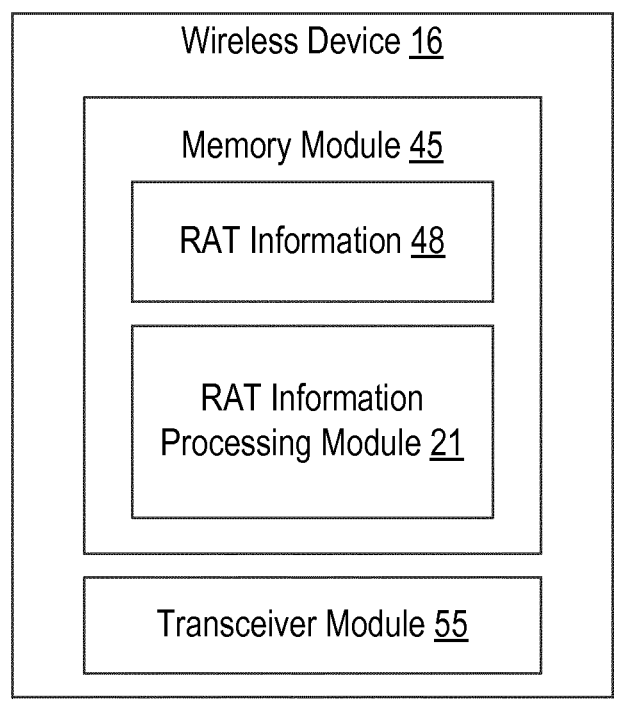
FIG. 5 is a block diagram of an alternative embodiment of the NR wireless device.

FIG. 5 is a block diagram of an alternative embodiment of the wireless device 16 which includes a memory module 45 configured to store the RAT information received by the transceiver module 55 and processed by the RAT information processing module 21. In one or more embodiments, transceiver module 55 is configured to receive second RAT information, and receive transmissions including first RAT resources and second RAT resources. In one or more embodiments, RAT information processing module 21 is configured to determine, at a resource element level, resources reserved for second RAT transmissions based on the second RAT information, and process at least first RAT resources based at least in part on the second RAT information.

The RAT information processing module 21 may be implemented as software executed by a processor and is configured to process RAT information such as LTE/NB-IoT information contained in the signal/communication. In one or more embodiments, NR wireless device 16 may be configured to receive the scheduled LTE and NB-IoT downlink transmissions. The transceiver module 55 may be implemented in part by software executed by a processor.

Figure 6:
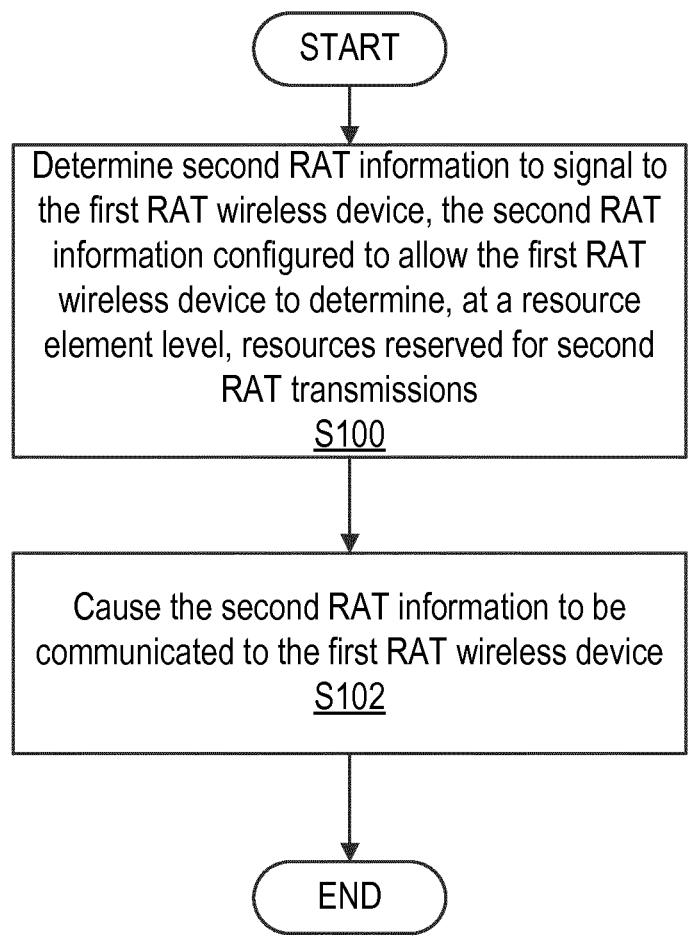
FIG. 6 is a flowchart of an exemplary process for determining and signaling LTE/NB-IoT information to an NR wireless device.

FIG. 6 is a flowchart of an exemplary process in a network node 14 for determining and signaling RAT information such as LTE/NB-IoT information to an NR wireless device 16. Processing circuitry 22 is configured to determine second RAT information to signal to the first RAT wireless device 16 where the second RAT information is configured to allow the first RAT wireless device 16 to determine, at a resource element level, resources reserved for second RAT transmissions (Block S100). In one or more embodiments, processing circuitry 22 is configured to determine LTE/NB-IoT information to signal to the NR wireless device 16 where the LTE/NB-IoT information is configured to allow the NR wireless device 16 to determine, at a resource element level, resources reserved for LTE/NB-IoT transmissions. Processing circuitry 22 is configured to cause the second RAT information to be communicated to the first RAT wireless device 16 (Block S102). In one or more embodiments, processing circuitry 22 is configured to cause the NB-IoT information to be communicated to the NR wireless device 16.

In one or more embodiments, the process includes determining LTE/NB-IoT information via the RAT information determination unit 18 to signal to the NR wireless device 16 to enable the NR wireless device 16 to determine resources, such as NR resources, reserved for use for LTE and NB-IoT downlink transmissions. In one or more embodiments, the RAT information is signaled or communicated, via the transceiver 34, to the NR wireless device 16. In one or more embodiments, the resources reserved for the second RAT transmissions include a first plurality of resource elements of a first symbol. The second RAT information is configured to allow the first RAT wireless device 16 to differentiate second RAT transmissions on the first plurality of resource elements of the first symbol from first RAT transmissions on a second plurality of resources elements of the first symbol where the first plurality of resources element being different from the second plurality of resource elements.

In one or more embodiments, functions of the network node 14 can be distributed across network cloud 12 so that other nodes can perform one or more functions or even parts of functions described herein. For example, network node 14A, e.g., eNodeB, may be configured to perform one or more functions of the signaling process described herein, while network node 14B, e.g., gNB, in communication with network node 14A, is configured to perform one or more other functions of the signaling process described herein. In one or more embodiments, network node 14A is configured to determine second RAT information to signal to the first RAT wireless device 16 and cause the second RAT information to be communicated to the first RAT wireless device 16 by transmitting the second RAT information to network node 14B, where network node 14B transmits the second RAT information to wireless device 16, as discussed herein. In one or more embodiment the RAT information may be provided to network node 14, part of a radio access network (RAN), by a core network. In one or more embodiments, one or more of the functions performed by network node 14 are performed by the core network.

Figure 7:
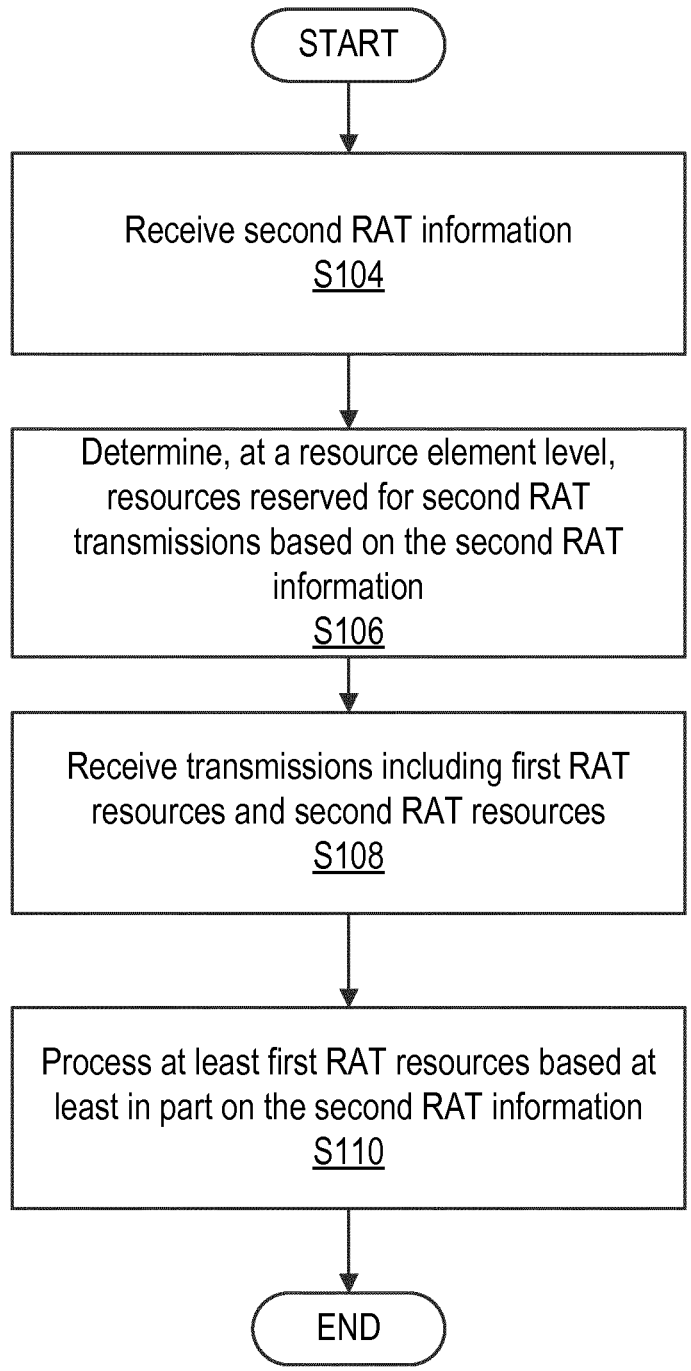
FIG. 7 is a flowchart of an exemplary process in a NR wireless device for processing signals from a network node having information relating to long term evolution (LTE) and narrow band Internet of things (NB-IOT) wireless communications.

FIG. 7 is a flowchart of an exemplary process in a NR wireless device 16 for processing RAT information such as second RAT information relating to LTE/NB-IoT wireless communications. Processing circuitry 42 is configured to receiving second RAT information (Block S104). In one or more embodiments, processing circuitry 42 is configured to receiving NB-IoT information. Processing circuitry 42 is configured to determine, at a resource element level, resources reserved for second RAT transmissions based on the second RAT information (Block S106). In one or more embodiments, processing circuitry 42 is configured to determine, at a resource element level, resources reserved for NB-IoT transmissions based on the NB-IoT information. Processing circuitry 42 is configured to receive transmissions including first RAT resources and second RAT resources (Block S108). In one or more embodiments, processing circuitry 42 is configured to receive transmissions including NR resources and NB-IoT resources. Processing circuitry 42 is configured to process at least first RAT resources based at least in part on the second RAT information (Block S110). In one or more embodiments, processing circuitry 42 is configured to process at least NR RAT resources based at least in part on the NB-IoT RAT information.

In one or more embodiments, the process includes receiving, via the transceiver 54, the signal from the network node 14, the signal containing LTE/NB-IoT information. In one or more embodiments, NR wireless device 16 may be enabled to receive the scheduled LTE and NB-IoT downlink transmissions. In one or more embodiments, the process also includes processing, via the RAT information processing unit 20, the LTE/NB-IoT information contained in the signal to configure the NR wireless device 16 to receive the scheduled LTE and NB-IoT downlink transmission.

Figure 8:
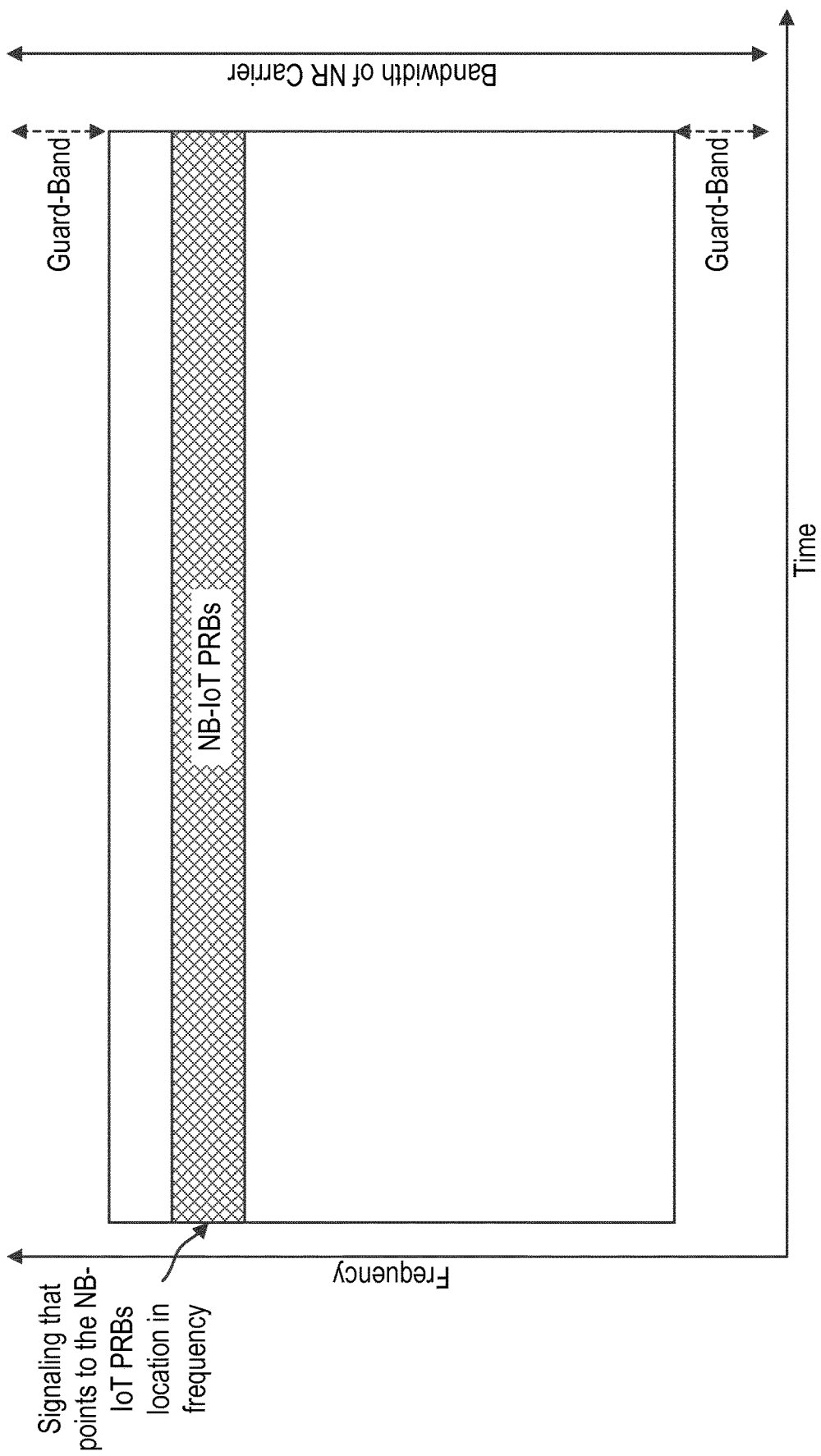
FIG. 8 is an illustration of locating NB-IoT PRB resources in a frequency dimension.
Figure 9:
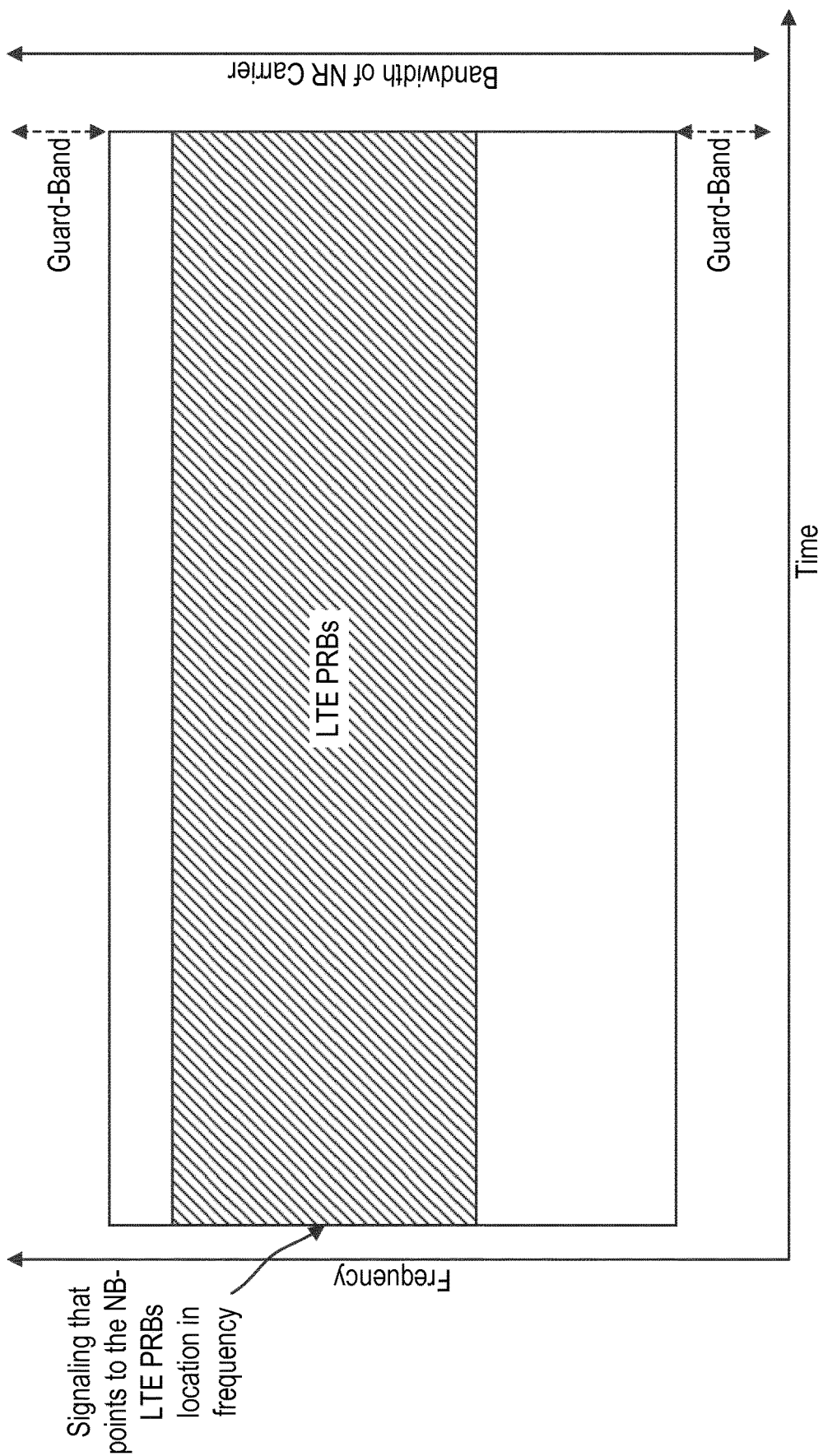
FIG. 9 is an illustration of locating LTE PRB resources in a frequency dimension.

Discussion of the information items 1-10, listed above, and their processing by the NR wireless device 16 is further described as follows. Regarding item 1 above, RAT information including one or more PRB indices is configured to help NR wireless device 16 locate the NB-IoT/LTE resources within the bandwidth of the NR carrier in the frequency dimension as illustrated in FIGS. 8 and 9. In particular, FIG. 8 is a block diagram of time-frequency grid where the PRB indices point to NB-IoT PRB location(s) in frequency and may be signaled to the NR wireless device 16 such as to help NR wireless device 16 locate the NB-IoT PRBs. FIG. 9 is a block diagram of a time-frequency grid where the PRB indices point to LTE PRB location(s) in frequency and may be signaled to the NR wireless device 16 such as to help NR wireless device 16 locate the LTE PRBs. In one or more embodiments, the RAT information includes the information indicated in Item 1 and item 8 if NR and LTE cells are subcarrier aligned (i.e., NR and LTE cells share the same subcarrier grid) but not PRB aligned (i.e. PRB boundaries are not aligned).

The RAT information can be signaled in the format of a range of NR subcarrier indices according to a certain NR numerology, e.g., the same numerology as used for the synchronization signal block (SS Block) or the numerology that the NR carrier is configured with, etc. Alternatively, the NB-IoT and LTE PRB locations can be signaled by providing both the carrier offset, i.e., the offset between the centers of the NR carrier and NB-IoT or LTE carrier, and the bandwidth of the LTE/NB-IoT signal. Regardless, such RAT information can be interpreted by an NR wireless device for determining the NB-IoT and LTE PRB locations.

Figure 10:
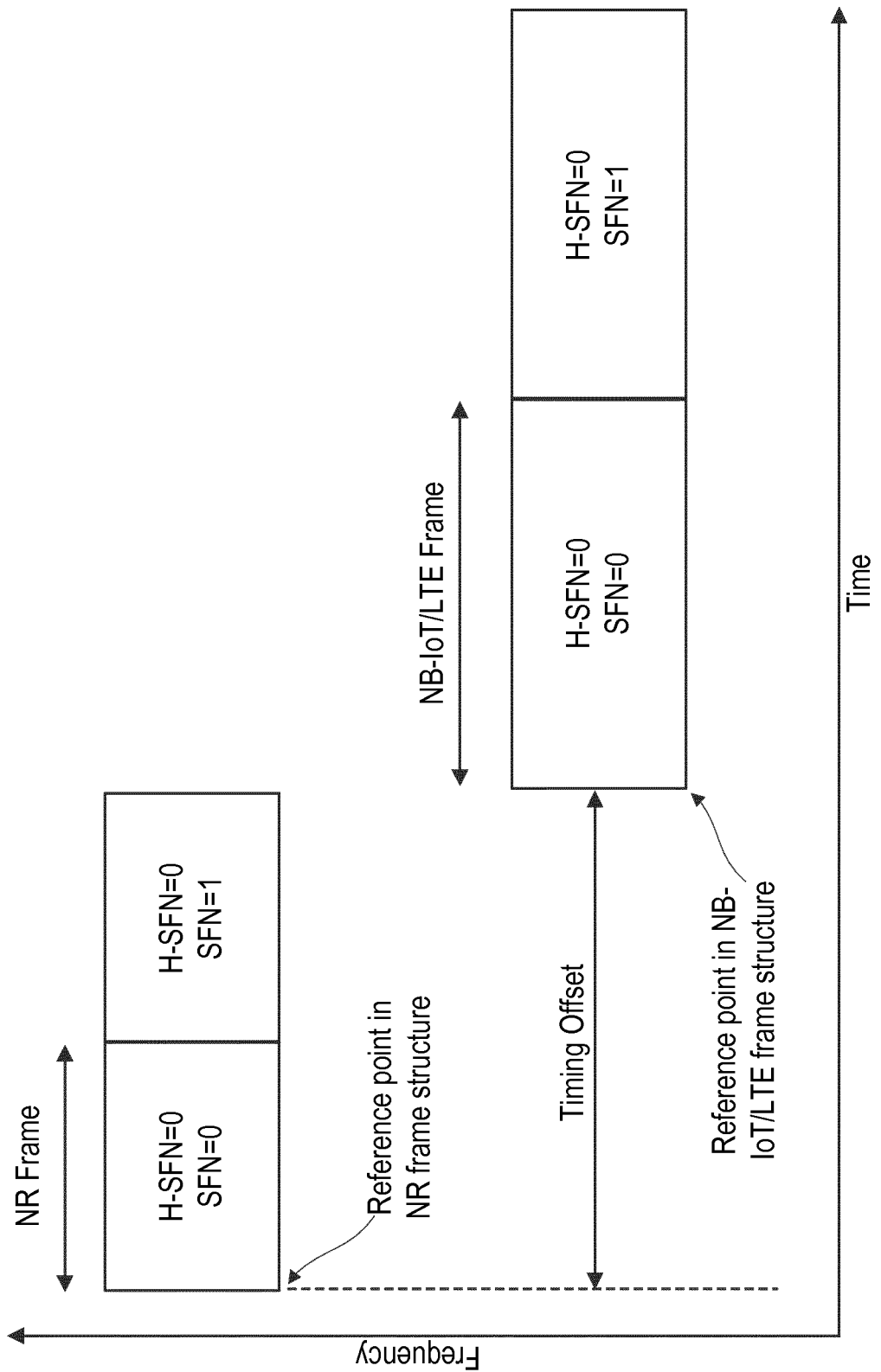
FIG. 10 illustrates locating LTE/NB-IoT radio frames with reference to NR radio subframe numbers.

Regarding item 2, RAT information including the timing relationship between NR cell and LTE/NB-IoT cell allows the NR wireless device 16 to determine the NB-IoT/LTE frame structure in terms of one or more of hypersystem frame number (H-SFN), system frame number (SFN) and subframe numbers. One or more embodiments of this arrangement are provided in FIG. 10 that illustrates a block diagram of the RAT information that allows the NR wireless device 16 to determine the NB-IoT/LTE frame structure.

For example, reference points in the NR and NB-IoT/LTE frame structure are established, respectively. The reference points could be, e.g., the start point of (H-SFN, SFN)=(0,0) in NR and NB-IoT/LTE frame structure. One or more of these reference points are included in the RAT information. Also, in one or more embodiments, a time offset value can be provided as part of the RAT information. Alternatively, NR, LTE, and NB-IoT can align the starting point of H-SFN, SFN=(0,0), or any other reference point. In that case, in one or more embodiments, the signaling of such timing relationship may be omitted or skipped.

Additionally, signaling of the LTE CP information as described in item 9 may be signaled to allow an NR wireless device to determine whether normal cyclic prefix (CP) or extended CP is used in the LTE cell. In one or more embodiments, with normal CP, there are 14 OFDM symbols per LTE subframe, and with extended CP there are 12 OFDM symbols per subframe. Signaling this information allows the NR wireless device to determine the exact resources used by LTE physical channels and signals including one or more of NPSS, NSSS, NPBCH, PDCCH, PCFICH, PHICH, CRS, CSI-RS, PRS, etc. Furthermore, certain LTE subframes (subframe #2, #3, #4, #6, #7, or #8) may be configured as a MBSFN, which has different slot format compared to non-MBSFN subframes. A description about which LTE subframes may be signaled is contained in item 10, listed above.

Figure 11:
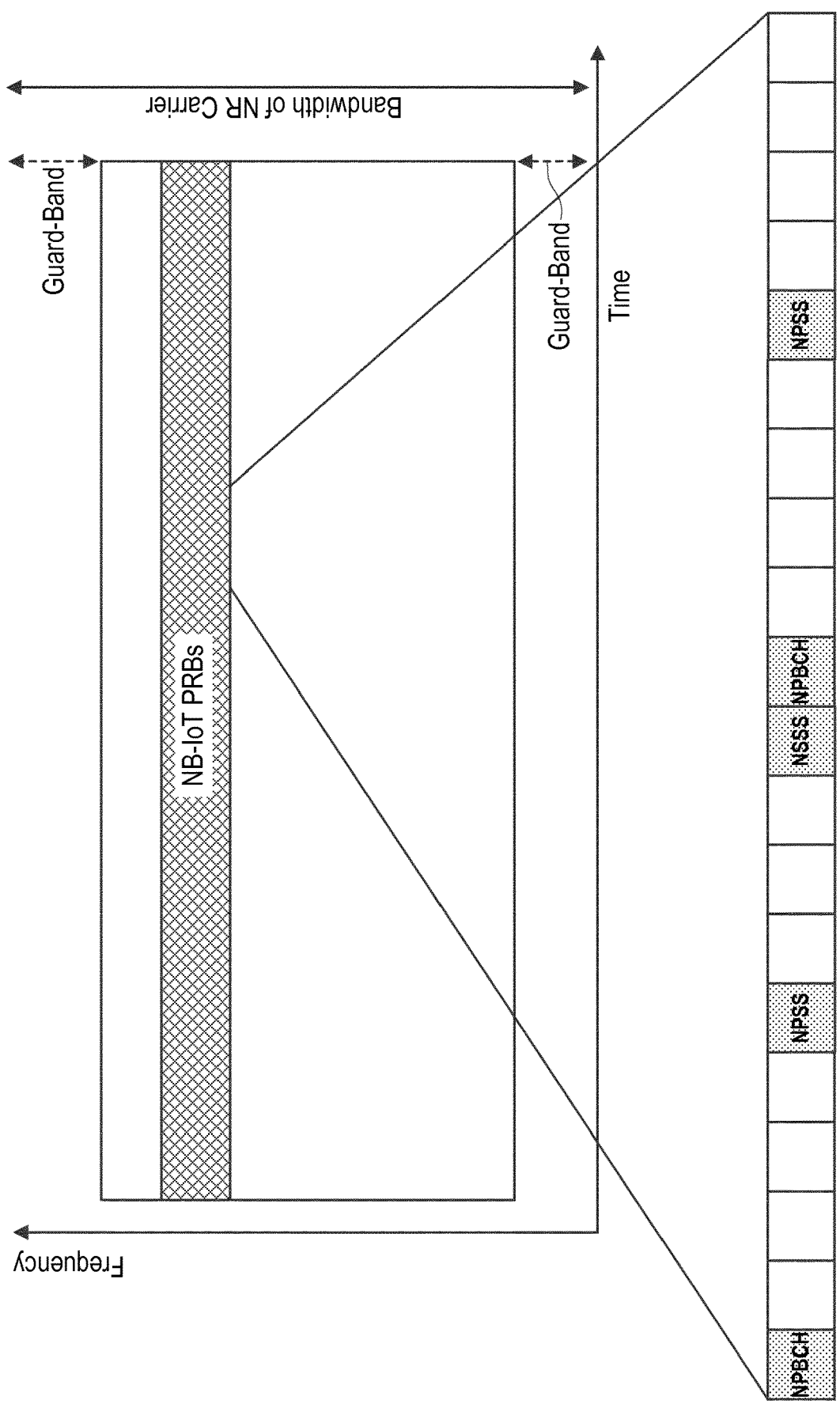
FIG. 11 illustrates locating NB-IoT synchronization signals by an NR wireless device.

With RAT information of items 1 and 2, the NR wireless device can identify NB-IoT NPBCH, NPSS and/or NSSS subframes used in a NB-IoT cell as illustrated in FIG. 11 that is a block diagram time-frequency grid where NR wireless device 14 has identified NPBCH, NPSS, NSSS used in an NB-IoT cell. Effectively, signaling item 1 and 2 together configures NR reserved resources as those occupied by NPBCH, NPSS, and NSSS as illustrated in FIG. 11. Similarly, with information of items 1 and 2), the NR wireless device 16 can identify LTE PBCH, PSS, and SSS used in an LTE cell. Effectively, signaling item 1 and 2 together configures NR reserved resources as those occupied by PBCH, PSS, and SSS.

Figure 12:
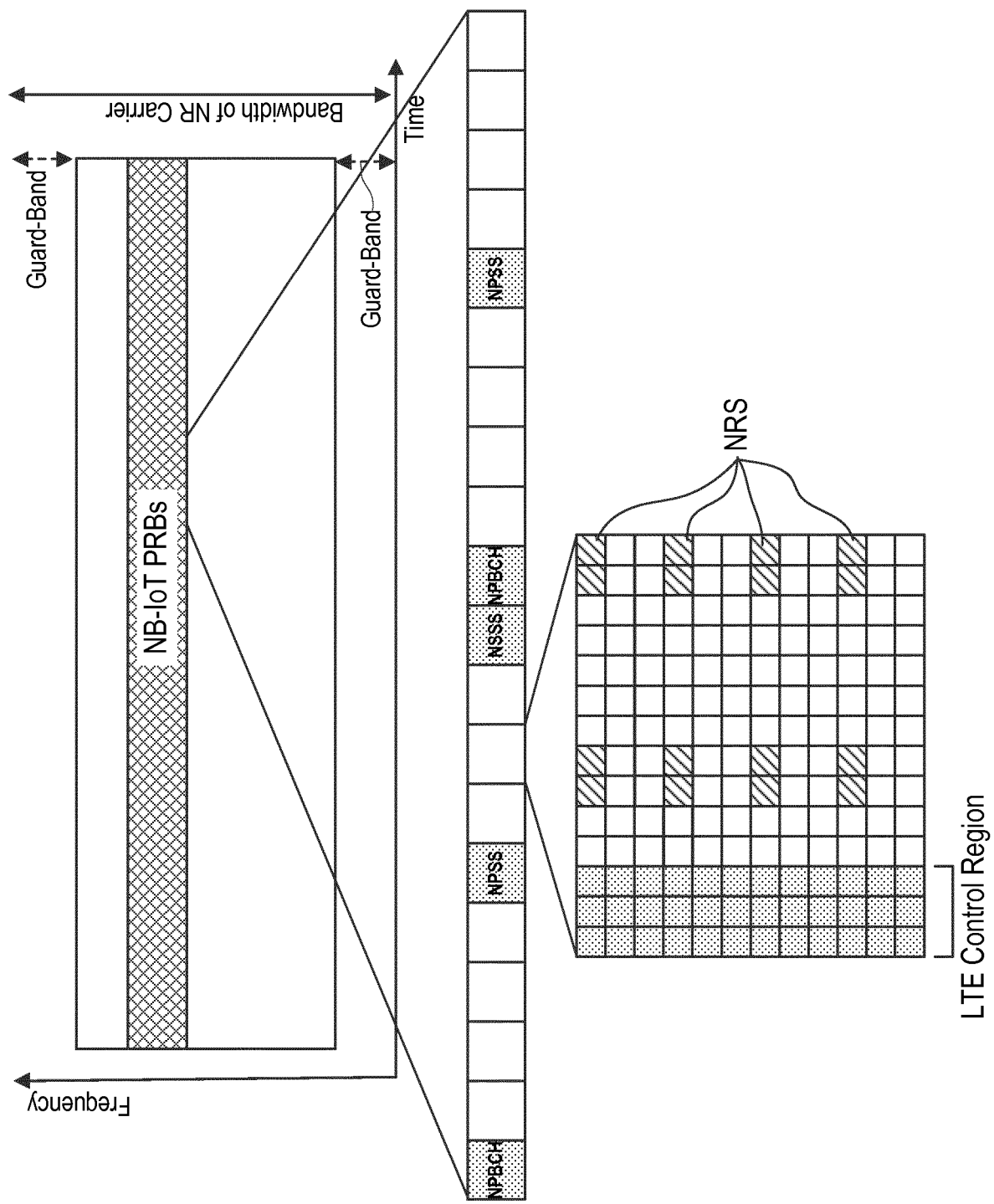
FIG. 12 illustrates synchronization signals in an LTE control region of a NB-IoT cell.

Signaling the information described in item 3 such as the PCID and number of Narrowband Reference Signal (NRS)/Cell Specific Reference Signal (CRS) ports may allow the NR wireless device 16 to locate the resource elements used by NB-IoT NRS or LTE CRS since, in one or more embodiments, the subcarrier indices of CRS and NRS are determined by the cell ID or PCID. Furthermore, signaling the information described in item 4 such as an indication of the downlink control region may allow NR wireless device 16 to locate the resources elements used by the LTE control region. Effectively, signaling information described in items 1, 2, 3 and 4, together, configures NR reserved resources as those occupied by NPBCH, NPSS, NSSS, narrowband reference signal (NRS), and LTE control region in a NB-IoT cell, as illustrated in FIG. 12. In other words, NR wireless device 16 is able to determine NR reserved resources where these NR reserved resources match or coincide with NB-IoT NPBCH, NPSS, NSSS, NRS and LTE control region as illustrated in FIG. 12. Similarly, signaling information described in items (1), (2), (3), and (4), together, configures NR reserved resources to match or coincide with PBCH, PSS, SSS, CRS, and LTE control region in an LTE cell.

Regarding the information described in item 5 (i.e., SIB1, SIB1-BR, SIB1-NB scheduling information), this information may be used to locate the resources that are used to transmit LTE/NB-IoT system/scheduling information. Using NB-IoT as an example, a number of repetitions and cell ID are used to determine which radio frames contain SIB1-NB transmissions. The radio frames that contain SIB1-NB transmissions may use subframe #4 to transmit SIB1-NB. The subframes that are used for transmitting SIB1, SIB1-BR and SIB1-NB may be part of the configured NR reserved resources.

Regarding the information described in item 6 (i.e., LTE (N)PDSCH valid subframe bitmap patterns), LTE MTC and NB-IoT can designate certain subframes as invalid subframes. When a subframe is designated as an invalid subframe, the invalid subframe can be excluded from the NR reserved resources as these radio resources are not used by LTE MTC/NB-IoT, thereby allowing NR wireless device 16 to determine one or more resources to exclude from the NR reserved resources.

Regarding the information described in item 7 (i.e., SI message scheduling information), the scheduling information for (N)PDSCH transmissions carrying SI messages for LTE MTC and NB-IoT may be signaled in SIB1-BR and SIB1-NB, respectively. The information fields in SIB1-BR/SIB1-NB that contain the SI message scheduling information, or the whole SIB1-BR/SIB1-NB message, can be signaled in order to configure NR reserved resources or help allow NR wireless device 16 to determine NR reserved resources.

In summary, by signaling information described in any one of items 1-10 or other RAT information in accordance with the teachings herein, NR reserved resources can be configured to tailor to the radio resources used for non-dynamically scheduled LTE/NB-IoT downlink transmission. In one or more embodiments, the NR reserved resources coincide or match at least a portion of non-dynamically scheduled LTE/NB-IoT downlink transmissions such that NR wireless device 16 can determine, at the resource element level (in one embodiment), resources elements coinciding with these non-dynamic LTE/NB-IoT transmissions and resources for NR transmissions. One or more of the information items described in items 1-10 could either be signaled individually or in a few common combinations of (a subset of) the individual parameters could be defined (e.g., in a table) with the network indicating which combination of reserved resources to be used. Predefining common combinations could simplify overall testing and reduce signaling overhead but may have less flexibility than individual signaling.

Therefore, signaling RAT information such as described in one or more of items 1-10 allows for the configuration of NR reserved resources for supporting NR co-carrier co-existence with LTE/NB-IoT and allows for more efficient resource sharing between NR and LTE/NB-IoT. Further, the NR reserved resources, described herein, may advantageously be identified with finer resolution in both the time and frequency dimensions, e.g., identified at the resource element level such as resource element by resource element. In one or more embodiments, specific resource elements can be reserved within an OFDM symbol, a slot, a resource block, or a subframe. This is more efficient than reserving an entire OFDM symbol, slot, resource block, or subframe where the entire OFDM symbol may be blanked/reserved for LTE/NB-IoT even though all of the resource elements may not be used for LTE/NB-IoT, which waste resources.

Some example methods:

Example 1. A method in a network node 14 configured to signal to a new radio (NR) wireless device 16 information relating to long term evolution (LTE) and narrow band Internet of things (NB-IOT) wireless communications, the method includes:
- determining LTE/NB-IoT information to signal to the NR wireless device 16 to enable the NR wireless device 16 to determine resources reserved for LTE and NB-IoT downlink transmissions; and
- signaling the determined LTE/NB-IoT information to the NR wireless device 16.

Example 2. The method of Example 1, wherein the LTE/NB-IoT information includes physical resource block (PRB) indices used by at least one of LTE and NB-IoT.

Example 3. The method of any of Examples 1 and 2, wherein the LTE/NB-IoT information includes a frequency relationship between an NR cell and an LTE/NB-IoT cell.

Example 4. The method of any of Examples 1-3, wherein the LTE/NB-IoT information includes a timing relationship between an NR cell and an LTE/NB-IoT cell.

Example 5. The method of any of Examples 1-4, wherein the LTE/NB-IoT information includes an indication whether the LTE cell uses one of a cyclic prefix (CP) and an extended CP.

Example 6. The method of any of Examples 1-5, wherein the LTE/NB-IoT information includes a physical cell identity and a number of reference signal ports.

Example 7. The method of any of Examples 1-6, wherein the LTE/NB-IoT information includes an LTE downlink control region.

Example 8. The method of any of Examples 1-7, wherein the LTE/NB-IoT information includes system information block (SIB) scheduling information.

Example 9. The method of any of Examples 1-8, wherein the LTE/NB-IoT information includes LTE physical downlink shared channel subframe bitmap patterns.

Example 10. The method of any of Examples 1-9, wherein the LTE/NB-IoT information includes system information message scheduling information.

Example 11. The method of any of Examples 1-10, wherein the LTE/NB-IoT information includes multi broadcast single frequency network (MBSFN) configuration information.

Example 12. A network node 14 configured to signal to a new radio (NR) wireless device 16 information relating to long term evolution (LTE) and narrow band Internet of things (NB-IOT) wireless communications, the network node 14 includes:
- processing circuitry 22 configured to determine LTE/NB-IoT information to signal to the NR wireless device 16 to enable the NR wireless device 16 to determine NR reserved resources that are used for LTE and NB-IoT downlink transmissions; and
- a transceiver 34 configured to signal the determined LTE/NB-IoT information to the NR wireless device 16.

Example 13. The network node 14 of Example 12, wherein the LTE/NB-IoT information includes physical resource block (PRB) indices used by at least one of LTE and NB-IoT.

Example 14. The network node 14 of any of Examples 12 and 13, wherein the LTE/NB-IoT information includes a frequency relationship between an NR cell and an LTE/NB-IoT cell.

Example 15. The network node 14 of any of Examples 12-14, wherein the LTE/NB-IoT information includes a timing relationship between an NR cell and an LTE/NB-IoT cell.

Example 16. The network node 14 of any of Examples 12-15, wherein the LTE/NB-IoT information includes an indication whether the LTE cell uses one of a cyclic prefix (CP) and an extended CP.

Example 17. The network node 14 of any of Examples 12-16, wherein the LTE/NB-IoT information includes a physical cell identity and a number of reference signal ports.

Example 18. The network node 14 of any of Examples 12-17, wherein the LTE/NB-IoT information includes an LTE downlink control region.

Example 19. The network node 14 of any of Examples 12-18, wherein the LTE/NB-IoT information includes system information block (SIB) scheduling information.

Example 20. The network node 14 of any of Examples 12-19, wherein the LTE/NB-IoT information includes LTE physical downlink shared channel subframe bitmap patterns.

Example 21. The network node 14 of any of Examples 12-20, wherein the LTE/NB-IoT information includes system information message scheduling information.

Example 22. The network node 14 of any of Examples 12-21, wherein the LTE/NB-IoT information includes multi broadcast single frequency network (MBSFN) configuration information.

Example 23. A network node 14 configured to signal to a new radio (NR) wireless device 16 information relating to long term evolution (LTE) and narrow band Internet of things (NB-IOT) wireless communications, the network node 14 includes:
- an LTE/NB-IoT information determination module configured to determine LTE/NB-IoT information to signal to the NR wireless device 16 to enable the NR wireless device 16 to determine NR reserved resources that are used for LTE and NB-IoT downlink transmissions; and
- a transceiver module 35 configured to signal the determined LTE/NB-IoT information to the NR wireless device 16.

Example 24. A method in a new radio (NR) wireless device 16 configured to receive and process signals from a network node having information relating to long term evolution (LTE) and narrow band Internet of things (NB-IOT) wireless communications, the method includes:
- receiving the signal from the network node, the signal containing LTE/NB-IoT information to enable the NR wireless device 16 to receive the scheduled LTE and NB-IoT downlink transmissions; and
- processing the LTE/NB-IoT information contained in the signal to configure the NR wireless device 16 to receive the scheduled LTE and NB-IoT downlink transmissions.

Example 25. The method of Example 24, wherein the NR wireless device 16 receives LTE/NB-IoT information that includes physical resource block (PRB) indices used by at least one of LTE and NB-IoT and uses the LTE/NB-IoT information to locate LTE/NB-IoT resources in frequency.

Example 26. The method of any of Examples 24 and 25, wherein the NR wireless device 16 receives LTE/NB-IoT information that includes a frequency relationship between an NR cell and an LTE/NB-IoT cell and uses the LTE/NB-IoT information to determine whether NR and LTE subcarriers are aligned.

Example 27. The method of any of Examples 24-26, wherein the NR wireless device 16 receives LTE/NB-IoT information that includes a timing relationship between an NR cell and an LTE/NB-IoT cell and uses the LTE/NB-IoT information to determine the LTE/NB-IoT frame structure in terms of NR subframe numbers.

Example 28. The method of any of Examples 24-27, wherein the NR wireless device 16 receives LTE/NB-IoT information that includes an indication whether the LTE cell uses one of a cyclic prefix (CP) and an extended CP and uses the LTE/NB-IoT information to determine a number of orthogonal frequency division multiplex (OFDM) symbols in a subframe.

Example 29. The method of any of Examples 24-28, wherein the NR wireless device 16 receives LTE/NB-IoT information that includes a physical cell identity and a number of reference signal ports and uses the LTE/NB-IoT information to locate resource elements used by LTE/NB-IoT channel reference signals.

Example 30. The method of any of Examples 24-29, wherein the NR wireless device 16 receives LTE/NB-IoT information that includes an LTE downlink control region and uses the LTE/NB-IoT information to locate resource elements used by the LTE downlink control region.

Example 31. The method of any of Examples 24-30, wherein the NR wireless device 16 receives LTE/NB-IoT information that includes system information block (SIB) scheduling information and uses the LTE/NB-IoT information to locate resources used to transmit LTE/NB-IoT system information.

Example 32. The method of any of Examples 24-31, wherein the NR wireless device 16 receives LTE/NB-IoT information that includes LTE physical downlink shared channel subframe bitmap patterns and uses the LTE/NB-IoT information to exclude subframes deemed invalid.

Example 33. The method of any of Examples 24-32, wherein the NR wireless device 16 receives LTE/NB-IoT information that includes system information message scheduling information, and uses the LTE/NB-IoT information to configure NR reserved resources Example 34. The method of any of Examples 24-33, wherein the LTE/NB-IoT information includes multi broadcast single frequency network (MBSFN) configuration information and uses the LTE/NB-IoT information to determine which LTE subframes can be signaled.

Example 35. The method of any of Examples 24-34, wherein the NR wireless device 16 determines channel coding rate matching parameters based on the determined NR reserved resources.

Example 36. A new radio (NR) wireless device 16 configured to receive and process signals from a network node 14 having information relating to long term evolution (LTE) and narrow band Internet of things (NB-IOT) wireless, the NR wireless device 16 includes:
  a transceiver 54 configured to receive the signal from the network node 14, the signal containing LTE/NB-IoT information to enable the NR wireless device 16 to determine NR reserved resources that are used for LTE and NB-IoT downlink transmissions; and
  processing circuitry 42 configured to process LTE/NB-IoT information contained in the signal to configure the NR wireless device 16 to receive the scheduled LTE and NB-IoT downlink transmissions.

Example 37. The NR wireless device 16 of Example 36, wherein the NR wireless device 16 receives LTE/NB-IoT information that includes physical resource block (PRB) indices used by at least one of LTE and NB-IoT and uses the LTE/NB-IoT information to locate LTE/NB-IoT resources in frequency.

Example 38. The NR wireless device 16 of any of Examples 36 and 37, wherein the NR wireless device 16 receives LTE/NB-IoT information that includes a frequency relationship between an NR cell and an LTE/NB-IoT cell and uses the LTE/NB-IoT information to determine whether NR and LTE subcarriers are aligned.

Example 39. The NR wireless device 16 of any of Examples 36-38, wherein the NR wireless device 16 receives LTE/NB-IoT information that includes a timing relationship between an NR cell and an LTE/NB-IoT cell and uses the LTE/NB-IoT information to determine the LTE/NB-IoT frame structure in terms of NR subframe numbers.

Example 40. The NR wireless device 16 of any of Examples 36-39, wherein the NR wireless device 16 receives LTE/NB-IoT information that includes an indication whether the LTE cell uses one of a cyclic prefix (CP) and an extended CP and uses the LTE/NB-IoT information to determine a number of orthogonal frequency division multiplex (OFDM) symbols in a subframe.

Example 41. The NR wireless device 16 of any of Examples 36-40, wherein the NR wireless device 16 receives LTE/NB-IoT information that includes a physical cell identity and a number of reference signal ports and uses the LTE/NB-IoT information to locate resource elements used by LTE/NB-IoT channel reference signals.

Example 42. The NR wireless device 16 of any of Examples 36-41, wherein the NR wireless device 16 receives LTE/NB-IoT information that includes an LTE downlink control region and uses the LTE/NB-IoT information to locate resource elements used by the LTE downlink control region.

Example 43. The NR wireless device 16 of any of Examples 36-42, wherein the NR wireless device 16 receives LTE/NB-IoT information that includes system information block (SIB) scheduling information and uses the LTE/NB-IoT information to locate resources used to transmit LTE/NB-IoT system information.

Example 44. The NR wireless device 16 of any of Examples 36-43, wherein the NR wireless device 16 receives LTE/NB-IoT information that includes LTE physical downlink shared channel subframe bitmap patterns and uses the LTE/NB-IoT information to exclude subframes deemed invalid.

Example 45. The NR wireless device 16 of any of Examples 36-44, wherein the NR wireless device 16 receives LTE/NB-IoT information that includes system information message scheduling information, and uses the LTE/NB-IoT information to configure NR reserved resources Example 46. The NR wireless device 16 of any of Examples 36-45, wherein the LTE/NB-IoT information includes multi broadcast single frequency network (MBSFN) configuration information and uses the LTE/NB-IoT information to determine which LTE subframes can be signaled.

Example 47. The NR wireless device 16 of any of Examples 36-46, wherein the NR wireless device 16 determines channel coding rate matching parameters based on the determined NR reserved resources.

Example 48. A new radio (NR) wireless device 16 configured to receive and process signals from a network node 14 having information relating to long term evolution (LTE) and narrow band Internet of things (NB-IOT), the NR wireless device 16 includes:

a transceiver module 55 configured to receive the signal from the network node 14, the signal containing LTE/NB-IoT information to enable the NR wireless device 16 to determine NR reserved resources that are used for LTE and NB-IoT downlink transmissions; and an LTE/NB-IoT information processing module 21 configured to process LTE/NB-IoT information contained in the signal to configure the NR wireless device 16 to receive the scheduled LTE and NB-IoT downlink transmissions.

Some Other Examples

According to aspect of the disclosure, a method performed by a network node 14 for providing support for frequency-overlapping carriers among a first radio access technology, RAT, and a second RAT is provided. Second RAT information to signal to the first RAT wireless device 16 is determined where the second RAT information is configured to allow the first RAT wireless device 16 to determine, at a resource element level, resources reserved for second RAT transmissions. The second RAT information is caused to be communicated to the first RAT wireless device 16.

According to one example of this aspect, the resources reserved for the second RAT transmissions include a first plurality of resource elements of a first symbol. The second RAT information is configured to allow the first RAT wireless device 16 to differentiate second RAT transmissions on the first plurality of resource elements of the first symbol from first RAT transmissions on a second plurality of resources elements of the first symbol where the first plurality of resources element being different from the second plurality of resource elements. According to one example of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

According to one example of this aspect, the reference signal transmission includes the transmission of a cell-specific reference signal. According to one example of this aspect, the second RAT information includes at least one of: at least one physical resource block, PRB, index used for the second RAT transmissions, a timing relationship between a first RAT cell and a second RAT cell, a physical cell identity and at least one number of at least one reference signal port, and an indication of a second RAT downlink control region. According to one example of this aspect, the second RAT information includes at least one of: System Information Block, SIB, scheduling information, physical downlink shared channel bitmap patterns for the second RAT, a system information, SI, message including scheduling information, and multi broadcast single frequency network, MBSFN, configuration information. According to one example of this aspect, the second RAT information includes a frequency relationship between a first RAT cell and a second RAT cell.

According to one example of this aspect, the second RAT information includes an indication whether a second RAT cell uses one of a cyclic prefix, CP, and an extended CP. According to one example of this aspect, the first RAT is New Radio, NR, and the second RAT is Long Term Evolution, LTE.

According to another aspect of the disclosure, a network node 14 for providing support for frequency-overlapping carriers among a first radio access technology, RAT, and a second RAT is provided. The network node 14 includes processing circuitry 22 configured to: determine second RAT information to signal to the first RAT wireless device 16 where the second RAT information is configured to allow the first RAT wireless device 16 to determine, at a resource element level, resources reserved for second RAT transmissions, and cause the second RAT information to be communicated to the first RAT wireless device.

According to one example of this aspect, the resources reserved for the second RAT transmissions include a first plurality of resource elements of a first symbol. The second RAT information is configured to allow the first RAT wireless device 16 to differentiate second RAT transmissions on the first plurality of resource elements of the first symbol from first RAT transmissions on a second plurality of resources elements of the first symbol where the first plurality of resources element being different from the second plurality of resource elements. According to one example of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

According to one example of this aspect, the reference signal transmission includes the transmission of a cell-specific reference signal. According to one example of this aspect, the second RAT information includes at least one of: at least one physical resource block, PRB, index used for the second RAT transmissions; a timing relationship between a first RAT cell and a second RAT cell; a physical cell identity and at least one number of at least one reference signal port; and an indication of a second RAT downlink control region. According to one example of this aspect, the second RAT information includes at least one of: System Information Block, SIB, scheduling information; physical downlink shared channel bitmap patterns for the second RAT; a system information, SI, message including scheduling information; and multi broadcast single frequency network, MBSFN, configuration information.

According to one example of this aspect, the second RAT information includes a frequency relationship between a first RAT cell and a second RAT cell. According to one example of this aspect, the second RAT information includes an indication whether a second RAT cell uses one of a cycle prefix, CP, and an extended CP. According to another aspect of the disclosure, a method performed by a wireless device 16 for supporting frequency-overlapping carriers among a first radio access technology, RAT, and a second RAT is provided. Second RAT information is received. Resources reserved for second RAT transmissions are determined, at the resource element level, based on the second RAT information. Transmissions including first RAT resources and second RAT resources are received. At least first RAT resources are processed based at least in part on the second RAT information.

According to one example of this aspect, the second RAT resources are processed based at least in part on the second RAT information. According to one example of this aspect, the second RAT resources include a first plurality of resource elements of a first symbol. According to one example of this aspect, reserved resources for second RAT transmissions on the first plurality of resource elements of the first symbol are differentiated, at the resource element level, from resources for the first RAT transmissions on a second plurality of resources elements of the first symbol where the first plurality of resources elements are different from the second plurality of resource elements.

According to one example of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission. According to one example of this aspect, the reference signal transmission includes the transmission of a cell-specific reference signal.

According to one example of this aspect, the second RAT information includes at least one of: at least one physical resource block, PRB, index used for the second RAT transmissions; a timing relationship between a first RAT cell and a second RAT cell; a physical cell identity and at least one number of at least one reference signal port; and an indication of a second RAT downlink control region. According to one example of this aspect, the second RAT information includes at least one of: System Information Block, SIB, scheduling information; physical downlink shared channel bitmap patterns for the second RAT; a system information, SI, message including scheduling information; and multi broadcast single frequency network, MBSFN, configuration information. According to one example of this aspect, the second RAT information include a frequency relationship between a first RAT cell and a second RAT cell.

According to one example of this aspect, the second RAT information includes an indication whether a second RAT cell uses one of a cycle prefix, CP, and an extended CP. According to one example of this aspect, the first RAT is New Radio, NR, and the second RAT is Long Term Evolution, LTE.

According to another aspect of the disclosure, a wireless device 16 for supporting frequency-overlapping carriers among a first radio access technology, RAT, and a second RAT is provided. The wireless device 16 includes processing circuitry 42 configured to: receive second RAT information; determine, at a resource element level, resources reserved for second RAT transmissions based on the second RAT information; receive transmissions including first RAT resources and second RAT resources; and process at least first RAT resources based at least in part on the second RAT information.

According to one example of this aspect, the processing circuitry 42 is further configured to process the second RAT resources based at least in part on the received second RAT information. According to one example of this aspect, the reserved resources for the second RAT transmissions include a first plurality of resource elements of a first symbol. According to one example of this aspect, the processing circuitry 42 is further configured to differentiate, at the resource element level, of reserved resources for second RAT transmissions on a first plurality of resource elements of the first symbol from resources for the first RAT transmissions on a second plurality of resources elements of the first symbol, the first plurality of resources elements being different from the second plurality of resource elements.

According to one example of this aspect, the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission. According to one example of this aspect, the reference signal transmission includes the transmission of a cell-specific reference signal. According to one example of this aspect, the second RAT information includes at least one of: at least one physical resource block, PRB, index used for the second RAT transmissions; a timing relationship between a first RAT cell and a second RAT cell; a physical cell identity and at least one number of at least one reference signal port; and an indication of a second RAT downlink control region.

According to one example of this aspect, the second RAT information includes at least one of: System Information Block, SIB, scheduling information; physical downlink shared channel bitmap patterns for the second RAT; a system information, SI, message including scheduling information; and multi broadcast single frequency network, MBSFN, configuration information. According to one example of this aspect, the second RAT information include a frequency relationship between a first RAT cell and a second RAT cell. According to one example of this aspect, the second RAT information includes an indication whether a second RAT cell uses one of a cycle prefix, CP, and an extended CP. According to one example of this aspect, the first RAT is New Radio, NR, and the second RAT is Long Term Evolution, LTE.

According to another aspect of the disclosure, a network node 14 for signaling information to a first radio access technology, RAT, wireless device 16 to allow the first RAT wireless device 16 to support frequency-overlapping carriers among the first RAT and a second RAT is provided. The network node 14 includes a RAT information determination module 19 configured to: determine second RAT information to signal to the first RAT wireless device 16, the second RAT information is configured to allow the first RAT wireless device 16 to determine, at a resource element level, resources reserved for second RAT transmissions; and cause the second RAT information to be communicated to the first RAT wireless device.

According to another aspect of the disclosure, a wireless device 16 for supporting frequency-overlapping carriers among a first radio access technology, RAT, and a second RAT is provided. The wireless device 16 includes transceiver module 55 configured to: receive second RAT information; and receive transmissions including first RAT resources and second RAT resources. The wireless device 16 includes RAT information processing module 21 configured to: determine, at a resource element level, resources reserved for second RAT transmissions based on the second RAT information; and process at least first RAT resources based at least in part on the second RAT information.

According to another aspect of the disclosure, a computer program product for providing support for frequency-overlapping carriers among a first radio access technology, RAT, and a second RAT is provided. The computer program product comprises computer readable program code that, when executed by a processor 26, causes the computer program product to perform one or more functions of network node 14 described herein.

According to another aspect of the disclosure, a computer program product for providing support for frequency-overlapping carriers among a first radio access technology, RAT, and a second RAT is provided. The computer program product comprises computer readable program code that, when executed by a processor 46, causes the computer program product to perform one or more functions of NR wireless device 16 described herein.

According to another aspect of the disclosure, a computer program for providing support for frequency-overlapping carriers among a first radio access technology, RAT, and a second RAT is provided. The computer program, when executed by a processor 26, performing one or more functions of network node 14 described herein.

According to another aspect of the disclosure, a computer program for providing support for frequency-overlapping carriers among a first radio access technology, RAT, and a second RAT is provided. The computer program, when executed by a processor 46, performing one or more functions of NR wireless device 16 described herein.

| Abbreviation | Explanation |
| --- | --- |
| CP | Cyclic prefix |
| CRS | Cell-specific reference signal |
| CSI-RS | Channel State Information Reference Signal |
| MBSFN | Multicast-broadcast single-frequency network |
| MIB | Master Information Block |
| MIB-NB | Master Information Block for NB-IoT |
| NPBCH | Narrowband Physical Broadcast Channel |
| NPDSCH | Narrowband Physical Downlink Shared Channel |
| NPSS | Narrowband Primary Synchronization Signal |
| NRS | Narrowband reference signal |
| NSSS | Narrowband Secondary Synchronization Signal |
| OFDM | Orthogonal Frequency Division Multiplex |
| PBCH | Physical Broadcast Channel |
| PCFICH | Physical Control Format Indicator Channel |
| PDCCH | Physical downlink control channel |
| PDSCH | Physical Downlink Shared Channel |
| PHICH | Physical Hybrid-ARQ Indicator Channel |
| PRB | Physical Resource Block |
| PRS | Positioning Reference Signal |
| PSS | Primary Synchronization Signal |
| SIB-NB | System Information Block 1 for NB-IoT |
| SIB1 | System Information Block 1 |
| SSS | Secondary Synchronization Signal |

As will be appreciated by one of skill in the art, some of the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a network node for providing support for frequency-overlapping carriers among a first radio access technology, RAT, and a second RAT, the method comprising:

determining second RAT information to signal to the first RAT wireless device, the second RAT information configured to allow the first RAT wireless device to determine, at a resource element level, resources reserved for second RAT transmissions the resources reserved for the second RAT transmissions including a first plurality of resource elements of a first symbol, the second RAT information is configured to allow the first RAT wireless device to differentiate second RAT transmissions on the first plurality of resource elements of the first symbol from first RAT transmissions on a second plurality of resources elements of the first symbol, the first plurality of resources element being different from the second plurality of resource elements; and causing the second RAT information to be communicated to the first RAT wireless device.

2. The method of claim 1, wherein the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

3. The method of claim 2, wherein the reference signal transmission includes the transmission of a cell-specific reference signal.

4. The method of claim 1, wherein the second RAT information includes at least one of:

at least one physical resource block, PRB, index used for the second RAT transmissions;

a timing relationship between a first RAT cell and a second RAT cell;

a physical cell identity and at least one number of at least one reference signal port; and an indication of a second RAT downlink control region.

5. The method of claim 1, wherein the second RAT information includes at least one of:

System Information Block, SIB, scheduling information;

physical downlink shared channel bitmap patterns for the second RAT;

a system information, SI, message including scheduling information; and multi broadcast single frequency network, MBSFN, configuration information.

6. The method of claim 1, wherein the second RAT information includes a frequency relationship between a first RAT cell and a second RAT cell.

7. The method of claim 1, wherein the second RAT information includes an indication whether a second RAT cell uses one of a cyclic prefix, CP, and an extended CP.

8. The method of claim 1, wherein the first RAT is New Radio, NR, and the second RAT is Long Term Evolution, LTE.

9. A network node for providing support for frequency-overlapping carriers among a first radio access technology, RAT, and a second RAT, the network node comprising:

processing circuitry configured to:

determine second RAT information to signal to the first RAT wireless device, the second RAT information configured to allow the first RAT wireless device to determine, at a resource element level, resources reserved for second RAT transmissions, the resources reserved for the second RAT transmissions including a first plurality of resource elements of a first symbol, the second RAT information is configured to allow the first RAT wireless device to differentiate second RAT transmissions on the first plurality of resource elements of the first symbol from first RAT transmissions on a second plurality of resources elements of the first symbol, the first plurality of resources element being different from the second plurality of resource elements; and cause the second RAT information to be communicated to the first RAT wireless device.

10. The network node of claim 9, wherein the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

11. The network node of claim 10, wherein the reference signal transmission includes the transmission of a cell-specific reference signal.

12. A method performed by a wireless device for supporting frequency-overlapping carriers among a first radio access technology, RAT, and a second RAT the method comprising:

receiving second RAT information;

determining, at a resource element level, resources reserved for second RAT transmissions based on the second RAT information;

receiving transmissions including first RAT resources and second RAT resources, the second RAT resources including a first plurality of resource elements of a first symbol;

differentiating, at the resource element level, of reserved resources for second RAT transmissions on the first plurality of resource elements of the first symbol from resources for the first RAT transmissions on a second plurality of resources elements of the first symbol, the first plurality of resources elements being different from the second plurality of resource elements; and processing at least first RAT resources based at least in part on the second RAT information.

13. The method of claim 12, wherein the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

14. The method of claim 13, wherein the reference signal transmission includes the transmission of a cell-specific reference signal.

15. The method of claim 12, wherein the second RAT information includes at least one of:

at least one physical resource block, PRB, index used for the second RAT transmissions;

a timing relationship between a first RAT cell and a second RAT cell;

a physical cell identity and at least one number of at least one reference signal port; and an indication of a second RAT downlink control region.

16. The method of claim 12, wherein the second RAT information includes at least one of:
- System Information Block, SIB, scheduling information;
- physical downlink shared channel bitmap patterns for the second RAT;
- a system information, SI, message including scheduling information; and
- multi broadcast single frequency network, MBSFN, configuration information.

17. The method of claim 12, wherein the second RAT information includes a frequency relationship between a first RAT cell and a second RAT cell.

18. The method of claim 12, wherein the second RAT information includes an indication whether a second RAT cell uses one of a cycle prefix, CP, and an extended CP.

19. The method of claim 12, wherein the first RAT is New Radio, NR, and the second RAT is Long Term Evolution, LTE.

20. A wireless device for supporting frequency-overlapping carriers among a first radio access technology, RAT, and a second RAT, the wireless device comprising:
processing circuitry configured to:
- receive second RAT information;
- determine, at a resource element level, resources reserved for second RAT transmissions based on the second RAT information, the reserved resources for the second RAT transmissions including a first plurality of resource elements of a first symbol;
- receive transmissions including first RAT resources and second RAT resources;
- differentiate, at the resource element level, of reserved resources for second RAT transmissions on a first plurality of resource elements of the first symbol from resources for the first RAT transmissions on a second plurality of resources elements of the first symbol, the first plurality of resources elements being different from the second plurality of resource elements; and
- process at least first RAT resources based at least in part on the second RAT information.

21. The wireless device of claim 20, wherein the reserved resources for the second RAT transmissions correspond to resources reserved for at least one of synchronization signal transmission, master information block, MIB, transmission, system information block, SIB, transmission, system information, SI, message transmission, downlink control information transmission, and reference signal transmission.

22. The wireless device of claim 21, wherein the reference signal transmission includes the transmission of a cell-specific reference signal.

23. The wireless device of claim 20, wherein the second RAT information includes at least one of:
- at least one physical resource block, PRB, index used for the second RAT transmissions;
- a timing relationship between a first RAT cell and a second RAT cell;
- a physical cell identity and at least one number of at least one reference signal port; and
- an indication of a second RAT downlink control region.

24. The wireless device of claim 20, wherein the second RAT information includes at least one of:
- System Information Block, SIB, scheduling information;
- physical downlink shared channel bitmap patterns for the second RAT;
- a system information, SI, message including scheduling information; and
- multi broadcast single frequency network, MBSFN, configuration information.

25. The wireless device of claim 20, wherein the second RAT information includes a frequency relationship between a first RAT cell and a second RAT cell.

26. The wireless device of claim 20, wherein the second RAT information includes an indication whether a second RAT cell uses one of a cycle prefix, CP, and an extended CP.

27. The wireless device of claim 20, wherein the first RAT is New Radio, NR, and the second RAT is Long Term Evolution, LTE.

* * * * *

UNITED STATES PATENT AND TRADEMARK OFFICE
CERTIFICATE OF CORRECTION

PATENT NO. : 11,159,949 B2
APPLICATION NO. : 16/491493
DATED : October 26, 2021
INVENTOR(S) : Baldemair et al.

Page 1 of 1

It is certified that error appears in the above-identified patent and that said Letters Patent is hereby corrected as shown below:

In the Claims

In Column 27, Line 10, in Claim 1, delete "transmissions" and insert -- transmissions, --, therefor.

Signed and Sealed this
Twenty-fifth Day of October, 2022

Katherine Kelly Vidal
*Director of the United States Patent and Trademark Office*